United States Patent
Tsukagoshi

(10) Patent No.: US 10,349,144 B2
(45) Date of Patent: Jul. 9, 2019

(54) RECEPTION DEVICE, RECEIVING METHOD, TRANSMISSION DEVICE, AND TRANSMITTING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/572,313

(22) PCT Filed: Apr. 20, 2016

(86) PCT No.: PCT/JP2016/002109
§ 371 (c)(1),
(2) Date: Nov. 7, 2017

(87) PCT Pub. No.: WO2016/199337
PCT Pub. Date: Dec. 15, 2016

(65) Prior Publication Data
US 2018/0109850 A1    Apr. 19, 2018

(51) Int. Cl.
*H04N 21/488* (2011.01)
*H04N 5/278* (2006.01)
(Continued)

(52) U.S. Cl.
CPC ......... *H04N 21/4884* (2013.01); *H04N 5/278* (2013.01); *H04N 5/44504* (2013.01);
(Continued)

(58) Field of Classification Search
CPC .................................................. H04N 21/4884
(Continued)

(56) References Cited

U.S. PATENT DOCUMENTS 7,145,633 B2 * 12/2006 Nishimoto .............. G03F 7/703
355/47
9,338,422 B2 * 5/2016 Uchimura .............. H04N 5/278
(Continued)

FOREIGN PATENT DOCUMENTS

JP     2012-169885 A    9/2012
JP     2016-111691      6/2016
(Continued)

OTHER PUBLICATIONS

International Search Report dated Jul. 12, 2016 in PCT/JP2016/002109.
(Continued)

*Primary Examiner* — Paulos M Natnael
(74) *Attorney, Agent, or Firm* — Oblon, McClelland, Maier & Neustadt, L.L.P.

(57) ABSTRACT

The technology is directed to keeping high image quality when a subtitle is superimposed on a video. A reception device includes circuitry configured to receive a video stream and a subtitle stream. The circuitry processes the video stream to obtain video data of a video. The circuitry processes the subtitle stream to obtain subtitle bitmap data of a subtitle bitmap image. The circuitry adjusts a color gamut of the subtitle bitmap data to a color gamut of the video data. The color gamut of the subtitle bitmap data is adjusted based on color gamut identification information of the subtitle bitmap data and color gamut identification information of the video data. The circuitry further superimposes, on the video, the color gamut adjusted subtitle bitmap image.

12 Claims, 20 Drawing Sheets

(51) Int. Cl.
*H04N 5/445* (2011.01)
*H04N 19/46* (2014.01)
*H04N 9/67* (2006.01)

(52) U.S. Cl.
CPC ............... *H04N 19/46* (2014.11); *H04N 9/67* (2013.01); *H04N 2005/44526* (2013.01)

(58) Field of Classification Search
USPC .................................. 348/564, 565, 569, 468
See application file for complete search history.

(56) References Cited

U.S. PATENT DOCUMENTS

| | | | |
|---|---|---|---|
| 9,455,281 B2* | 9/2016 | Sato | H01L 27/1255 |
| 2001/0012444 A1* | 8/2001 | Ito | H04N 5/44543 |
| | | | 386/248 |
| 2009/0184887 A1* | 7/2009 | Mizuno | G06F 3/1423 |
| | | | 345/1.1 |
| 2015/0245004 A1* | 8/2015 | Guo | H04N 5/46 |
| | | | 348/453 |
| 2016/0063949 A1* | 3/2016 | Tsuchida | G09G 5/005 |
| | | | 345/590 |
| 2016/0191929 A1* | 6/2016 | Hwang | H04N 19/30 |
| | | | 725/110 |
| 2017/0142499 A1* | 5/2017 | Oh | H04N 21/8543 |
| 2017/0155966 A1* | 6/2017 | Oh | H04N 21/4884 |
| 2017/0221524 A1* | 8/2017 | Uchimura | G11B 27/036 |
| 2017/0311034 A1* | 10/2017 | Nishi | H04N 21/4402 |
| 2018/0054660 A1* | 2/2018 | Hwang | H04N 21/8543 |
| 2018/0262785 A1* | 9/2018 | Hwang | H04N 21/236 |

FOREIGN PATENT DOCUMENTS

| | | |
|---|---|---|
| WO | WO 2014/130213 A1 | 8/2014 |
| WO | WO 2015/007910 A1 | 1/2015 |

OTHER PUBLICATIONS

Japanese Office Action dated Jan. 22, 2019 in Application No. 2015-116893 (No English translation), 4 pages.

\* cited by examiner

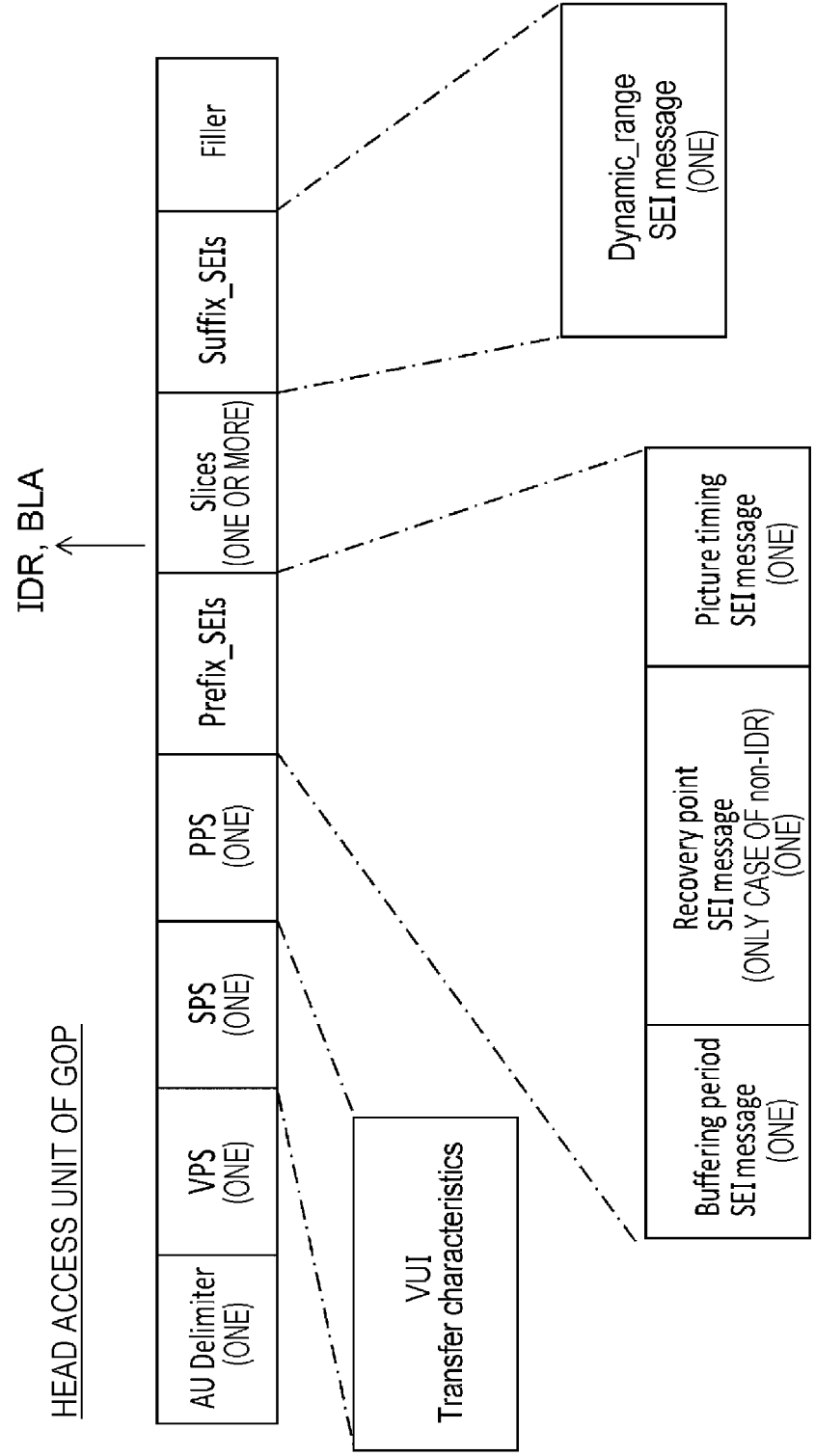

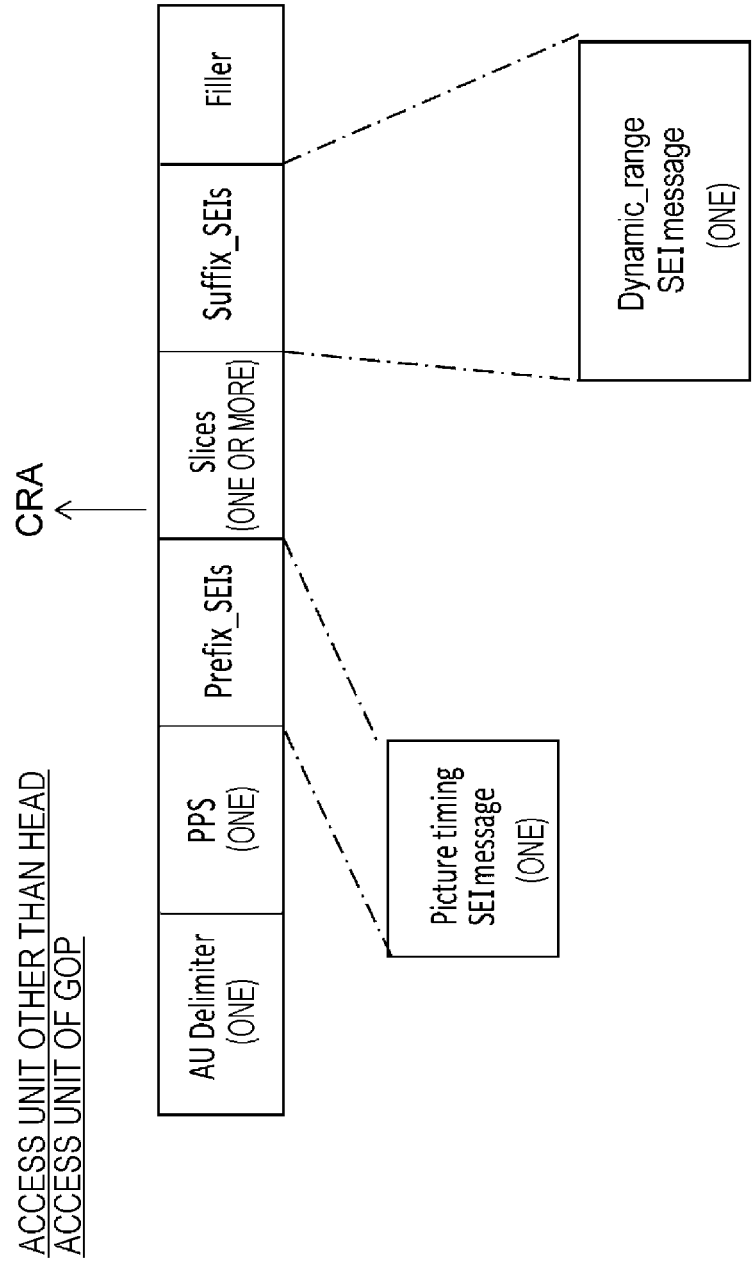

FIG. 6A  Dynamic_range SEI syntax

| Syntax | No. of Bits | Format |
|---|---|---|
| Dynamic_range SEI ( ) { | | |
|   Dynamic_range_id | ue(v) | |
|   Dynamic_range_cancel_flag | u(1) | bslbf |
|   if( ! Dynamic_range_cancel_flag ) { | | |
|     coded_bit_depth | 8 | uimsbf |
|     reference_level | 7 | uimsbf |
|     reserved | 1 | 0x1 |
|     transfer_function | 8 | uimsbf |
|   } | | |
| } | | |

FIG. 6B  semantics

```
coded_data_bit_depth   (8bits)   ENCODED PIXEL BIT NUMBER
reference_level        (7bits)   REFERENCE LUMINANCE LEVEL
transfer_function      (8bit)    EOTF (REVERSED OETF)
```

FIG. 7

TTML STRUCTURE

```
<tt xml:lang="" xmlns="http://www.w3.org/ns/ttml">
   <head>
      <metadata/>
      <styling/>
      <layout/>
   </head>
   <body/>
</tt>
```

FIG. 8A

TTML Metadata (TTM)

```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

FIG. 8B

TTML Styling    (TTS)

```
<styling xmlns:tts="http://www.w3.org/ns/ttml#styling">
    <!-- s1 specifies default color, font, and text alignment -->
    <style xml:id="s1"
        tts:extent="80px60px" tts:origin=="48px20px"
        tts:color="white"
        tts:fontFamily="proportionalSansSerif"
        tts:fontSize="22px"
        tts:textAlign="center"
    />
    <set bigin=" 0s" dur=" Xs" tts:opacity=" 1.0" />
    <!– alternative using yellow text but otherwise the same as style s1 →
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

FIG. 8C

TTML Layout   ( region )

```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

FIG. 9

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

FIG. 10A

TTML Metadata (TTM)

```
<metadata xmlns:ttm="http://www.w3.org/ns/ttml#metadata">
  <ttm:title>Timed Text TTML Example</ttm:title>
  <ttm:copyright>The Authors (c) 2006</ttm:copyright>
  <ttm-ext:renderingcontrol
      ttm-ext:colorspace="ITUR2020"
      ttm-ext:dynamicrange="sdr"
  />
</metadata>
```

FIG. 10B

```
ttm-ext:colorspace=
    "ITUR2020"
    "sRGB"

// INDICATE WHETHER COLOR GAMUT IS STANDARD COLOR GAMUT (sRGB)
   OR WIDE COLOR GAMUT (ITUR2020).

ttm-ext:dynamicrange=
    "hdrmapped"
    "sdr"
    "Linear"

// INDICATE WHETHER PHOTOELECTRIC CONVERSION HAS NOT BEEN APPLIED ("Linear"),
   WHETHER SDR PHOTOELECTRIC CONVERSION HAS BEEN APPLIED UNDER PRECONDITION OF
   SUPERPOSITION ON VIDEO ("sdr"), OR WHETHER HDR PHOTOELECTRIC CONVERSION HAS BEEN
   APPLIED AND FURTHER LUMINANCE RANGE IS LIMITED UP TO REFERENCE LEVEL OF HDR UNDER
   PRECONDITION OF SUPERPOSITION ON HDR VIDEO ("hdrmapped").
```

FIG. 11

TTML Styling Extension  (TTSE)

```
<styling xmlns:ttsextension="http://www.w3.org/ns/ttml#stylingextension">
    <!-- s1 specifies default color, font, and text alignment -->
    <styleextension xml:id="s1"
         ttse:colorspace="ITUR2020"
         ttse:dynamicrange="sdr"
    />
</styling>
```

FIG. 12

| Syntax | Size | Type |
|---|---|---|
| Rendering_Segment() { | | |
| sync_byte | 8 | bslbf |
| segment_type | 8 | bslbf |
| page_id | 16 | bslbf |
| segment_length | 16 | uimsbf |
| version_number | 8 | bslbf |
| number_of_regions | 8 | uimsbf |
| for (i=0; i< number_of_regions; i++) { | | |
| region_id ( = xml:id) | 16 | uimsbf |
| colorspace_type | 8 | uimsbf |
| dynamicrange_type | 8 | uimsbf |
| } | | |
| } | | |

FIG. 13A subtitle_WCGHDR descriptor syntax

| Syntax | No. of Bits | Format |
|---|---|---|
| subtitle_WCGHDR descriptor( ) { | | |
| descriptor_tag | 8 | uimsbf |
| descriptor_length | 8 | uimsbf |
| dynamic_range_type | 3 | bslbf |
| color_gamut_type | 3 | bslbf |
| reserved | 2 | 0x3 |
| } | | |
| } | | |
| } | | |

FIG. 13B

```
color_gamut_type
    001  "ITUR2020"
    010  "sRGB"

dynamic_range_type
    000  "Linear"
    001  "hdrmapped"
    010  "sdr"
```

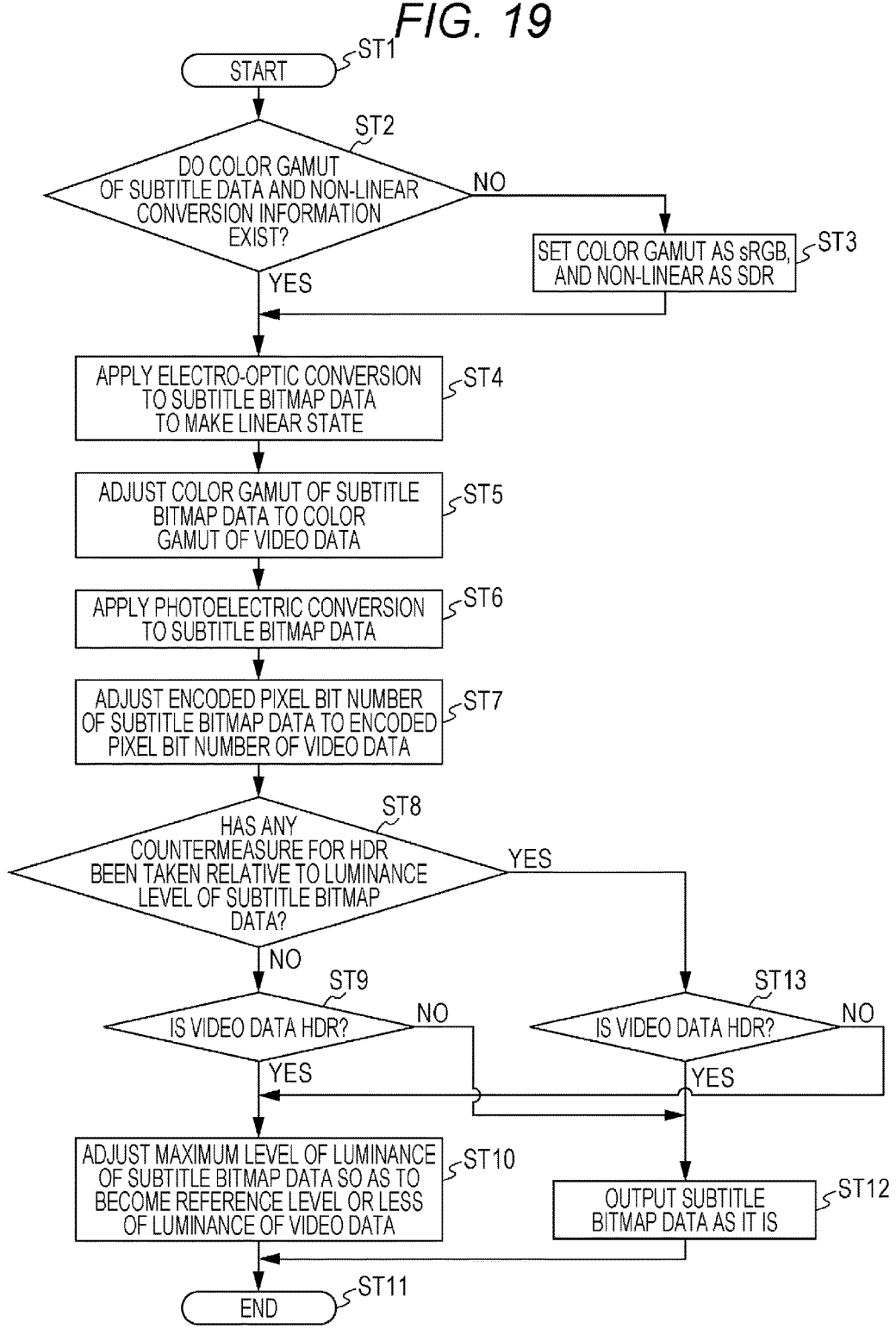

RECEPTION DEVICE, RECEIVING METHOD, TRANSMISSION DEVICE, AND TRANSMITTING METHOD

CROSS REFERENCE TO RELATED APPLICATIONS

This application claims the benefit of Japanese Priority Patent Application JP 2015-116893 filed on Jun. 9, 2015, the entire contents of which are incorporated herein by reference.

TECHNICAL FIELD

The present technology relates to a reception device, a receiving method, a transmission device, and a transmitting method, more specifically, relates to a reception device and the like that performs processing to superimpose subtitle data on video data.

BACKGROUND ART

In the related art, for example, caption information is transmitted as bitmap data in broadcasting such as digital video broadcasting (DVB). Recently, proposed is a technology in which subtitle information is transmitted as character codes of text, that is, transmitted in a text base (see Patent Literature 1).

CITATION LIST

Patent Literature

PTL 1: JP 2012-169885 A

SUMMARY

Technical Problem

In the related art, when video data and subtitle data are respectively transmitted in separate streams, there is no clear difference in color gamut and luminance between both data. Therefore, both data are combined without any special consideration at the time of superposition.

For example, in the case where the color gamut of video data is a wide color gamut (conforming to ITU-R Rec Bt.2020, for example) and the color gamut of subtitle data is a narrow color gamut (sRGB, for example), superposition may be needed to be performed after adjusting the color gamut of the subtitle data to the color gamut of the video data in order to keep high video image quality.

Further, in the case where the video data is produced in a high dynamic range (HDR) and the subtitle data is produced in a standard-level dynamic range (SDR), superposition may be needed to be performed after adjusting the subtitle data to a dynamic range region of the video data in order to keep high video image quality.

The present technology is directed to keeping high image quality when the subtitle data is superimposed on the video data.

Solution to Problem

A concept of the present technology is a reception device that includes circuitry configured to receive a video stream and a subtitle stream. The circuitry is configured to process the video stream to obtain video data of a video. The circuitry is configured to process the subtitle stream to obtain subtitle bitmap data of a subtitle bitmap image. The circuitry is configured to adjust a color gamut of the subtitle bitmap data to a color gamut of the video data. The color gamut of the subtitle bitmap data is adjusted based on color gamut identification information of the subtitle bitmap data and color gamut identification information of the video data. Further, the circuitry is configured to superimpose, on the video, the color gamut adjusted subtitle bitmap image.

According to an embodiment of the present technology, a container in a predetermined format in which the video stream and the subtitle stream are included is received by a reception unit implemented by the circuitry. The video data can be obtained by a video decoding unit implemented by the circuitry that processes the video stream. The subtitle bitmap data can be obtained by a subtitle decoding unit, implemented by the circuitry, that processes the subtitle stream.

The color gamut of the subtitle bitmap data is adjusted to the color gamut of the video data by a color gamut processing unit, implemented by the circuitry, based on the color gamut identification information of the subtitle bitmap data and the color gamut identification information of the video data. Further, the color gamut adjusted subtitle bitmap image is superimposed on the video by a video superimposing unit implemented by the circuitry.

For example, the color gamut identification information of the subtitle bitmap data is obtained from a layer of the subtitle stream or a layer of a container that includes the video stream and the subtitle stream. In this case, for example, the color gamut identification information of the subtitle bitmap data is set to a default range when the color gamut identification information of the subtitle bitmap data is not obtained from the layer of the subtitle stream or the layer of the container.

Thus, according to an embodiment of the present technology, the color gamut identification information of the subtitle bitmap data is adjusted to the color gamut of the video data based on the color gamut identification information of the subtitle bitmap data and the color gamut identification information of the video data. Therefore, high image quality can be kept when the subtitle is superimposed on the video.

Further, according to an embodiment of the present technology, it may be possible to further provide, for example, a luminance processing unit, implemented by the circuitry, that adjusts a maximum level of luminance of the subtitle bitmap data to a reference level or less of luminance of the video data, the maximum level of the luminance being adjusted based on dynamic range information of the subtitle bitmap data and dynamic range information of the video data. By thus adjusting the luminance of the subtitle bitmap data, high image quality can be kept when the subtitle is superimposed on the video.

For example, the dynamic range information of the subtitle bitmap data is obtained from a layer of the subtitle stream or a layer of a container that includes the video stream and the subtitle stream. In this case, for example, the dynamic range of the subtitle bitmap data is set to a default range when the dynamic range information of the subtitle bitmap data is not obtained from the layer of the subtitle stream or the layer of the container.

Further, according to an embodiment of the present technology, it may be possible to further provide a video level adjustment unit, implemented by the circuitry, interposed between the video decoding unit and the video superimposing unit and adapted to adjust a luminance level in a region of the video in which the color gamut adjusted subtitle bitmap image is superimposed. By thus adjusting the luminance level of the video, the subtitle can be prevented from being obstructed by a high luminance portion of background video (background image), and readability of the subtitle can be improved.

For example, the video level adjustment unit may decrease a luminance level of video corresponding to a high luminance pixel existing in the region of the video in which the color gamut adjusted subtitle bitmap image is superimposed. Further, for example, the video level adjustment unit may adjust the luminance level of the video data when a mixing ratio of the video data in the video superimposing unit exceeds a threshold value. By this, the luminance level of the video data can be efficiently adjusted.

According to an embodiment of the present technology, there is provided a receiving method. The method includes receiving, by circuitry, a video stream and a subtitle stream. The method includes processing the video stream to obtain video data of a video. The method includes processing the subtitle stream to obtain subtitle bitmap data of a subtitle bitmap image. The method includes adjusting a color gamut of the subtitle bitmap data to a color gamut of the video data. The color gamut of the subtitle bitmap data is adjusted based on color gamut identification information of the subtitle bitmap data and color gamut identification information of the video data. The method further includes superimposing, on the video, the color gamut adjusted subtitle bitmap image.

Further, another concept of the present technology is a reception device that includes circuitry configured to receive a video stream and a subtitle stream. The circuitry is configured to process the video stream to obtain video data of a video. The circuitry is configured to process the subtitle stream to obtain subtitle bitmap data of a subtitle bitmap image. The circuitry is configured to adjust a maximum level of luminance of the subtitle bitmap data to a reference level or less of luminance of the video data. The maximum level of the luminance of the subtitle bitmap data is adjusted based on dynamic range information of the subtitle bitmap data and dynamic range information of the video data. The circuitry is further configured to superimpose, on the video, the luminance adjusted subtitle bitmap image.

According to an embodiment of the present technology, a container in a predetermined format in which the video stream and the subtitle stream are included is received by a reception unit implemented by the circuitry. The video data can be obtained by a video decoding unit, implemented by the circuitry, that processes the video stream. The subtitle bitmap data can be obtained by a subtitle decoding unit, implemented by the circuitry, that processes the subtitle stream.

The maximum level of luminance of the subtitle bitmap data is adjusted by a luminance processing unit, implemented by the circuitry, to the reference level or less of luminance of the video data, the maximum level of the luminance of the subtitle bitmap data being adjusted based on the dynamic range information of the subtitle bitmap data and the dynamic range information of the video data. The luminance adjusted subtitle bitmap image is superimposed on the video by a video superimposing unit implemented by the circuitry.

For example, the dynamic range information of the subtitle bitmap data is obtained from a layer of the subtitle stream or a layer of a container. In this case, for example, the dynamic range of the subtitle bitmap data is set to a default range when the dynamic range information of the subtitle bitmap data is not obtained from the layer of the subtitle stream or the layer of the container.

Thus, according to an embodiment of the present technology, the maximum level of luminance of the subtitle bitmap data is adjusted to the reference level or less of luminance of the video data based on the dynamic range information of the subtitle bitmap data and the dynamic range information of the video data. Therefore, high image quality can be kept when the subtitle is superimposed on the video.

Meanwhile, according to an embodiment of the present technology, for example, it may be possible to further provide a video level adjustment unit, implemented by the circuitry, interposed between the video decoding unit and the video superimposing unit and adapted to adjust a luminance level in a region of the video in which the luminance adjusted subtitle bitmap image is superimposed. By thus adjusting the luminance level of the video data, the subtitle can be prevented from being obstructed by a high luminance portion of the video, and readability of the subtitle can be improved.

For example, the video level adjustment unit may decrease a luminance level of video corresponding to a high luminance pixel existing in the region in which the luminance adjusted subtitle bitmap image is superimposed. Further, for example, the video level adjustment unit may adjust the luminance level of the video data when a mixing ratio of the video data in the video superimposing unit exceeds a threshold value. By this, the luminance level of the video data can be efficiently adjusted.

According to an embodiment of the present technology, there is provided there is provided a receiving method. The method includes receiving, by circuitry, a video stream and a subtitle stream. The method includes processing the video stream to obtain video data of a video. The method includes processing the subtitle stream to obtain subtitle bitmap data of a subtitle bitmap image. The method includes adjusting a maximum level of luminance of the subtitle bitmap data to a reference level or less of luminance of the video data. The maximum level of the luminance of the subtitle bitmap data is adjusted based on dynamic range information of the subtitle bitmap data and dynamic range information of the video data. The method further includes superimposing, on the video, the luminance adjusted subtitle bitmap image Further, another concept of the present technology is a transmission device that includes circuitry configured to transmit a video stream and a subtitle stream. The circuitry is configured to insert color gamut identification information and/or dynamic range information related to subtitle data, included in the subtitle stream, into a layer of the subtitle stream and/or a layer of a container including the video stream and the subtitle stream.

According to an embodiment of the present technology, a container in a predetermined format in which the video stream and the subtitle stream are included is transmitted. For example, the subtitle data may be subtitle text information in a predetermined format. The color gamut identification information and/or the dynamic range information related to the subtitle data are/is inserted into a layer of the subtitle stream and/or a layer of the container by an information inserting unit implemented by the circuitry.

Thus, according to an embodiment of the present technology, the color gamut identification information and/or the dynamic range information related to the subtitle data are/is inserted into the layer of the subtitle stream and/or the layer of the container. Therefore, a reception side can easily and suitably perform, based on the information, adjustment of the color gamut of the subtitle bitmap data conforming to the color gamut of the video data or adjustment of the maximum level of luminance of the subtitle bitmap data so as to become the reference level or less of luminance of the video data.

According to an embodiment of the present technology, there is provided a transmitting method. The method includes transmitting, by circuitry, a video stream and a subtitle stream. The method further includes inserting color gamut identification information and/or dynamic range information related to subtitle data, included in the subtitle stream, into a layer of the subtitle stream and/or a layer of a container including the video stream and the subtitle stream Advantageous Effects of Invention According to an embodiment of the present technology, high image quality can be kept when the subtitle data is superimposed on the video data. Note that the above effects described in the present specification are only examples and not limited thereto, and further additional effects may be provided as well.

BRIEF DESCRIPTION OF DRAWINGS

FIG. 4 is a diagram illustrating a head access unit of a GOP in the case where a coding system is HEVC.

FIG. 5 is a diagram illustrating an access unit of a GOP other than the head access unit in the case where the coding system is the HEVC.

FIG. 6A is a diagram illustrating an exemplary structure of a dynamic range/SEI message, and FIG. 6B is a diagram illustrating content of main information in the exemplary structure.

FIG. 7 is a diagram illustrating a TTML structure.

FIGS. 8A to 8C are diagrams illustrating exemplary structures of respective elements of metadata, styling, and layout existing in a head of the TTML structure.

FIG. 9 is a diagram illustrating an exemplary structure of a body of the TTML structure.

FIGS. 10A and 10B are diagrams illustrating exemplary structures of metadata (TTM: TTML Metadata) in the case of inserting color gamut identification information and dynamic range information by using the element of the metadata existing in the head of the TTML structure.

FIG. 11 is a diagram illustrating an exemplary structure of a styling extension (TTM: Styling Extension) in the case of inserting the color gamut identification information and the dynamic range information by using the element of the styling extension existing in the head of the TTML structure.

FIG. 12 is a diagram illustrating an exemplary structure of a rendering segment including the color gamut identification information and the dynamic range information.

FIG. 13A is an exemplary structure of subtitle_WCGHDR descriptor in which the color gamut identification information and the dynamic range information are described, and FIG. 13B is a diagram illustrating content of main information in the exemplary structure.

FIG. 19 is a flowchart illustrating an exemplary processing procedure of the color gamut/luminance conversion unit.

DESCRIPTION OF EMBODIMENTS

Modes to implement the technology (hereinafter referred to as "embodiments") will be described below. Note that description will be provided in the following order.
1. Embodiment
2. Modified Example
<1. Embodiment>
(Exemplary Structure of Transmitting/Receiving System)

Figure 1:
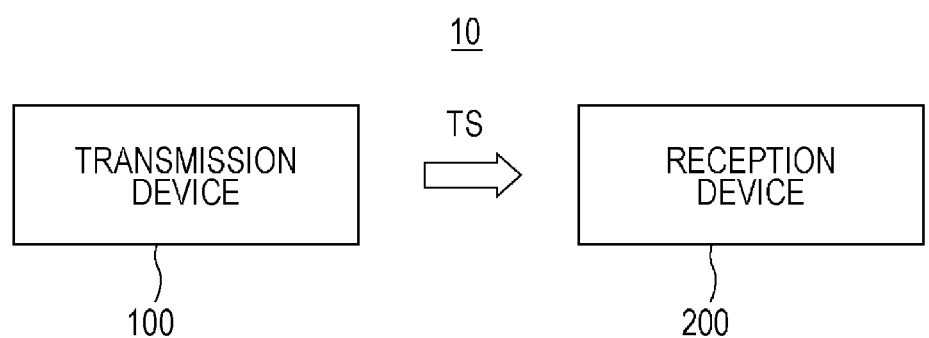
FIG. 1 is a block diagram illustrating an exemplary configuration of a transmitting/receiving system according to an embodiment.

FIG. 1 is a diagram illustrating an exemplary configuration of a transmitting/receiving system 10 according to an embodiment. The transmitting/receiving system 10 includes a transmission device 100 and a reception device 200.

The transmission device 100 generates a transport stream TS of MPEG2 as a container, and transmits the transport stream TS over airwaves or a packet on a network. In the transport stream TS, a video stream having video data (image data) is included.

Further, in the transport stream TS, a subtitle stream having subtitle data (caption data) is included. Here, the subtitle data is subtitle text information in a predetermined format or subtitle bitmap data. Color gamut identification information and dynamic range information related to the subtitle data are inserted into a layer of the subtitle stream and/or a layer of the container.

The reception device 200 receives the transport stream TS transmitted from the transmission device 100. The reception device 200 obtains video data by applying decoding processing to the video stream, and further obtains subtitle bitmap data by applying the decoding processing to the subtitle stream. Further, the reception device 200 obtains the video data for display by superimposing, on the video data, the subtitle bitmap data having color gamut and a luminance level adjusted based on the color gamut identification information and the dynamic range information of the subtitle bitmap data and the video data.

In this case, the color gamut of the subtitle bitmap data is adjusted to the color gamut of the video data based on the color gamut identification information of the subtitle bitmap data and the video data. Further, a maximum level of luminance of the subtitle bitmap data is adjusted so as to become a reference level or less of luminance of the video data based on the dynamic range information of the subtitle bitmap data and the dynamic range information of the video data.

Here, basically, the color gamut identification information and the dynamic range information related to the subtitle data obtained from the layer of the subtitle stream and/or the layer of the container are used. Meanwhile, in the case where the color gamut identification information and the dynamic range information related to the subtitle data are not obtained from the layer of the subtitle stream and/or the layer of the container, information set by default is used.

(Configuration of Transmission Device)

Figure 2:
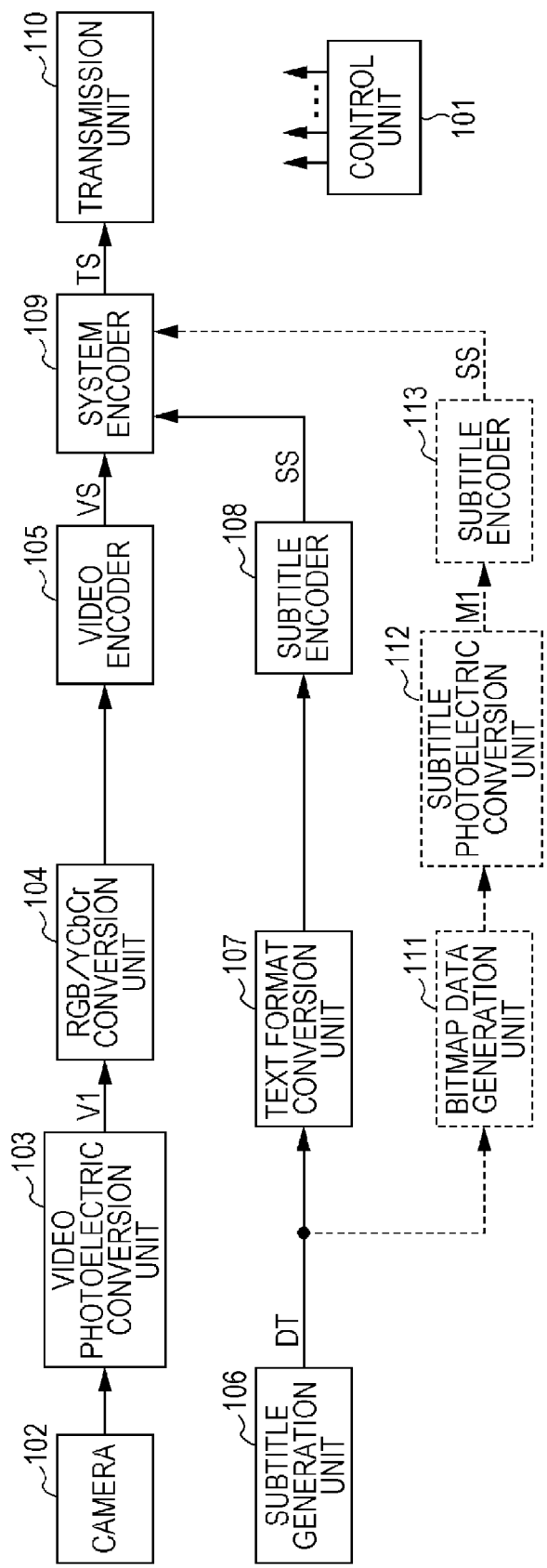
FIG. 2 is a block diagram illustrating an exemplary configuration of a transmission device.

FIG. 2 is a diagram illustrating an exemplary configuration of the transmission device 100. The transmission device 100 includes a control unit 101, a camera 102, a video photoelectric conversion unit 103, an RGB/YCbCr conversion unit 104, a video encoder 105, a subtitle generation unit 106, a text format conversion unit 107, a subtitle encoder 108, a system encoder 109, and a transmission unit 110.

Meanwhile, in the case of transmitting the subtitle bitmap data as the subtitle data instead of transmitting the subtitle text information as the subtitle data, the transmission device 100 includes a bitmap data generation unit 111, a subtitle photoelectric conversion unit 112, and a subtitle encoder 113 instead of the text format conversion unit 107 and the subtitle encoder 108.

The control unit 101 includes a central processing unit (CPU) and controls operation of respective units in the transmission device 100 based on a control program. The camera 102 captures an image of an object and outputs video data (image data) of a high dynamic range (HDR) or a standard dynamic range (SDR). The HDR image has a contrast ratio of 0 to 100%*N (N is larger than 1) such as 0 to 1000% exceeding luminance at a white peak of the SDR image. Here, 100% level corresponds to, for example, a white luminance value 100 cd/m$^2$.

The video photoelectric conversion unit 103 applies photoelectric conversion to the video data captured by the camera 102, and obtains transmission video data V1. In this case, in the case where the video data is the SDR video data, photoelectric conversion is performed by using an SDR photoelectric conversion characteristic, and SDR transmission video data (transmission video data made to have the SDR photoelectric conversion characteristic) is obtained. On the other hand, in the case where the video data is the HDR video data, photoelectric conversion is performed by using an HDR photoelectric conversion characteristic, and HDR transmission video data (transmission video data made to have the HDR photoelectric conversion characteristic) is obtained.

The RGB/YCbCr conversion unit 104 converts the transmission video data from an RGB domain to a YCbCr (luminance/color difference) domain. The video encoder 105 applies encoding, such as MPEG4-AVC or HEVC, to the transmission video data V1 having been converted to the YCbCr domain, and generates a video stream (PES stream) VS including encoded video data.

At this point, the video encoder 105 inserts, into a video usability information (VUI) area of an SPS NAL unit in an access unit (AU), information indicating an electric-photo conversion characteristic corresponding to the photoelectric conversion characteristic held by the transmission video data V1 (transfer function), information indicating color gamut of the transmission video data V1, and meta-information indicating a reference level, and the like.

Further, the video encoder 105 inserts, into a portion "SEIs" of the access unit (AU), a dynamic range/SEI message (Dynamic_range SEI message) that provides new definition and includes the information indicating an electric-photo conversion characteristic corresponding to the photoelectric conversion characteristic held by the transmission video data V1 (transfer function), the meta-information indicating a reference level, and the like.

Here, the reason for that dynamic range/SEI message is made to have the information indicating the electric-photo conversion characteristic is that: even when the transmission video data V1 is the HDR transmission video data, the information indicating the electric-photo conversion characteristic corresponding to the HDR photoelectric conversion characteristic may be needed in a place other than the VUI because information indicating an electric-photo conversion characteristic (gamma characteristic) corresponding to the SDR photoelectric conversion characteristic is inserted into the VUI of the SPS NAL unit in the case where the HDR photoelectric conversion characteristic is compatible with the SDR photoelectric conversion characteristic.

Figure 3:
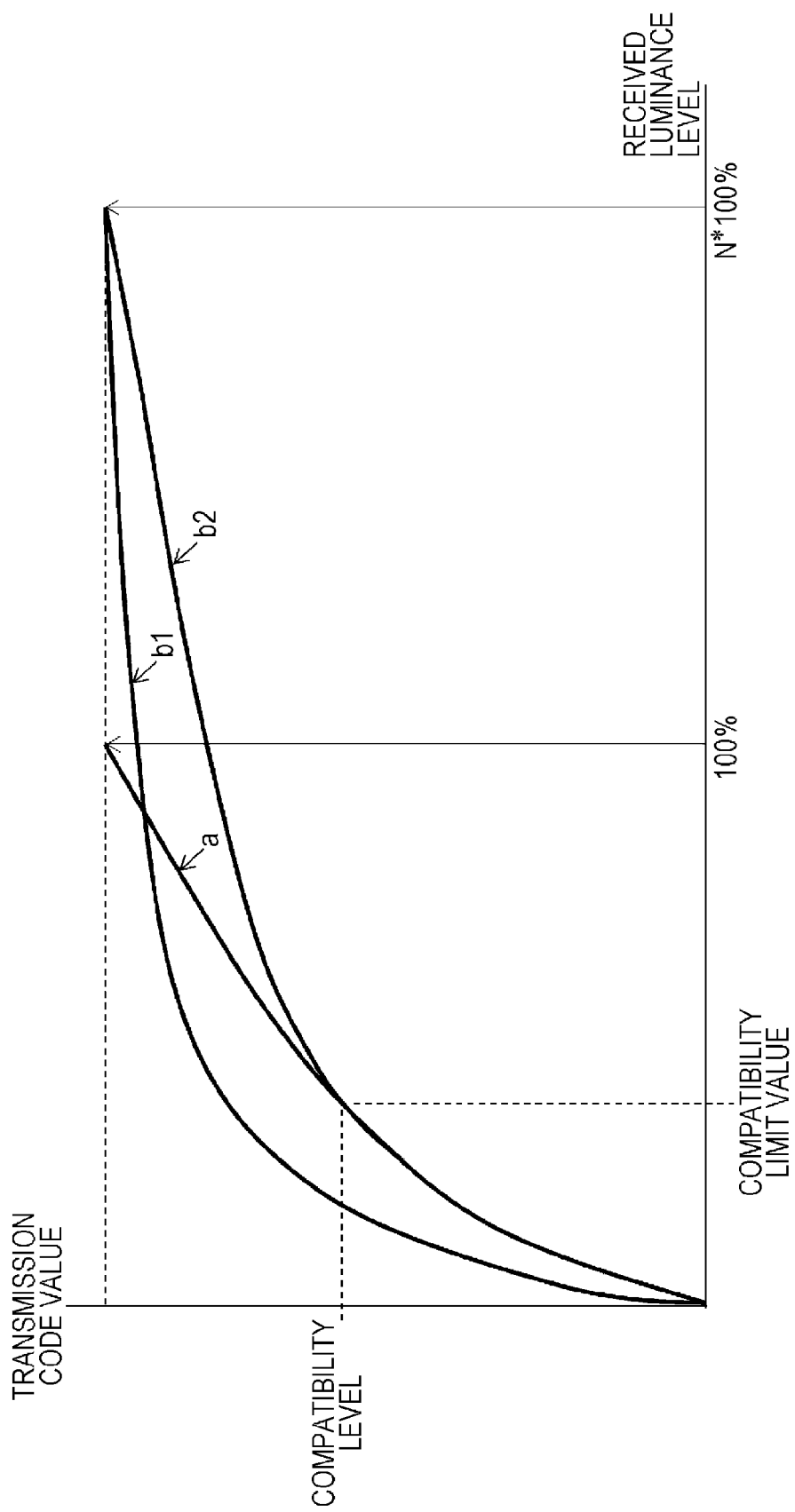
FIG. 3 is a diagram illustrating exemplary photoelectric conversion characteristics.

FIG. 3 is a diagram illustrating exemplary photoelectric conversion characteristics. In this diagram, a horizontal axis represents a received luminance level and a vertical axis represents a transmission code value. A curve a represents an exemplary SDR photoelectric conversion characteristic. Further, a curve b1 represents an exemplary HDR photoelectric conversion characteristic (not compatible with the SDR photoelectric conversion characteristic). Further, curve b2 represents an exemplary HDR photoelectric conversion characteristic (compatible with the SDR photoelectric conversion characteristic). In the case of these examples, the received luminance level coincides with the SDR photoelectric conversion characteristic until reaching a compatibility limit value. When the received luminance level is the compatibility limit value, a transmission code value becomes a compatibility level.

Further, the reason for that the dynamic range/SEI message is made to include the reference level is that: when the transmission video data V1 is the SDR transmission video data, there is no standard described related to insertion of the reference level although the information indicating the electric-photo conversion characteristic (gamma characteristic) corresponding to the SDR photoelectric conversion characteristic is inserted into the VUI of the SPS NAL unit.

FIG. 4 is a diagram illustrating a head access unit of a group of pictures (GOP) in the case where a coding system is HEVC. Further, FIG. 5 is a diagram illustrating an access unit of a GOP other than the head access unit in the case where the coding system is HEVC. In the case where the coding system is HEVC, a SEI message group "Prefix_SEIs" for decoding is arranged before slices having encoded image data, and a SEI message group "Suffix_SEIs" for displaying is arranged after the Slices. As illustrated in FIGS. 4 and 5, the dynamic range/SEI message may be arranged as the SEI message group "Suffix_SEIs".

FIG. 6A is a diagram illustrating an exemplary structure (Syntax) of the dynamic range/SEI message. FIG. 6B is a diagram illustrating content (Semantics) of main information in the exemplary structure. One-bit flag information "Dynamic_range_cancel_flag" indicates whether to refresh a message of "Dynamic_range". "0" indicates refreshing the message, and "1" indicates not refreshing the message, namely, keeping the message as it is.

When "Dynamic_range_cancel_flag" is "0", there are following fields. An 8-bit field in "coded_data_bit_depth" indicates encoded pixel bit number. An 8-bit field in "reference_level" indicates a reference luminance level value as the reference level. An 8-bit field in "transfer_function" indicates the electric-photo conversion characteristic corresponding to the photoelectric conversion characteristic held by the transmission video data V1.

Referring back to FIG. 2, the subtitle generation unit 106 generates text data (character code) DT as the subtitle information. The text format conversion unit 107 receives the text data DT and obtains subtitle text information in a predetermined format and obtains, in the present embodiment, timed text markup language (TTML).

FIG. 7 is a diagram illustrating a TTML structure. The TTML is described based on XML. In a head, there are respective elements such as metadata, styling, and layout. FIG. 8A is a diagram illustrating an exemplary structure of the metadata (TTM: TTML Metadata). The metadata includes title information of the metadata and copyright information.

FIG. 8B is a diagram illustrating an exemplary structure of the styling (TTS: TTML Styling). The styling includes information such as a color (color), a font (fontFamily), a size (fontSize), and alignment (textAlign) in addition to an identifier (id). Note that "tts:opacity" indicates a mixing ratio with background video. For example, "1.0" indicates that the subtitle (caption) is 100% and the background video is 0%, and "0.1" indicates that the subtitle (caption) is 0% and the background video is 100%. In the example of this diagram, "1.0" is described.

FIG. 8C is a diagram illustrating an exemplary structure of the layout (region: TTML layout). The layout includes information such as a range (extent), offset (padding), a background color (backgroundColor), and alignment (displayAlign) in addition to an identifier (id) of a region to arrange the subtitle.

FIG. 9 is a diagram illustrating exemplary structure of body. In the example of this diagram, information of three subtitles including a subtitle 1 (subtitle 1), a subtitle 2 (subtitle 2), and a subtitle 3 (subtitle 3) is included. In each of the subtitles, text data is described together with description of display start timing and display finish timing. For example, as for the subtitle 1 (subtitle 1), the display start timing is "0.76 s" and the display finish timing is "3.45 s", and text data of "It seems a paradox, dose it not," is described.

Referring back to FIG. 2, the subtitle encoder 108 converts the TTML obtained in the text format conversion unit 107 to various kinds of segments, and generates a subtitle stream SS formed of a PES packet having the segments arranged in a payload.

Further, the bitmap data generation unit 111 receives the text data DT generated in the subtitle generation unit 106, and generates subtitle bitmap data. The subtitle photoelectric conversion unit 112 applies photoelectric conversion to the subtitle bitmap data generated in the bitmap data generation unit 111, and obtains transmission bitmap data M1.

In this case, photoelectric conversion is performed by using the SDR photoelectric conversion characteristic, or photoelectric conversion is performed by using the HDR photoelectric conversion characteristic. Further, in the case of performing photoelectric conversion by using the HDR photoelectric conversion characteristic, a luminance range is limited up to the reference level of the HDR under the precondition of superposition on the HDR video. Note that there may be a structure not including the subtitle photoelectric conversion unit 112. In this case, the subtitle bitmap data generated in the bitmap data generation unit 111 is kept in a linear state and obtained as the transmission bitmap data M1.

The subtitle encoder 113 converts the transmission bitmap data M1 and display control information to various kinds of segments, and generates the subtitle stream SS including the PES packet having the segments arranged in the payload.

The system encoder 109 generates the transport stream TS including the video stream VS generated in the video encoder 105 and the subtitle stream SS generated in the subtitle encoder 108 or the subtitle encoder 113. The transmission unit 110 transmits the transport stream TS to the reception device 200 over airwaves or a packet in a network.

Here, the transmission device 100 inserts the color gamut identification information and the dynamic range information related to the subtitle data into the layer of the subtitle stream SS and/or the layer of the transport stream TS as the container as described above.

First, a case of inserting the information into the layer of the subtitle stream SS will be described. In the case where the subtitle stream SS includes the TTML as the subtitle text information, the transmission device 100 inserts the information by any one of following first, second, and third methods.

First Method

The color gamut identification information and the dynamic range information related to the subtitle data are inserted by using the element of metadata existing in the head of the TTML structure. In this case, insertion is performed in the text format conversion unit 107.

FIG. 10A is a diagram illustrating an exemplary structure of the metadata (TTM: TTML Metadata). FIG. 10B is a diagram illustrating an exemplary structure of content of main information in the exemplary structure. "ttm-ext:colorspace" indicates the color gamut identification information, and subsequently "ITUR2020" indicating a wide color gamut, "sRGB" indicating a standard color gamut, or the like is described. In the example in the diagram, "ITUR2020" is described.

"ttm-ext:dynamicrange" indicates the dynamic range information, and subsequently "hdrmapped", "sdr", "Linear", or the like is described. "hdrmapped" indicates that photoelectric conversion is performed by using the HDR photoelectric conversion characteristic and further the luminance range is limited up to the reference level of the HDR under the precondition of superposition on the HDR video. "sdr" indicates that photoelectric conversion is performed by using the SDR photoelectric conversion characteristic. "Linear" indicates the linear state without performing photoelectric conversion. In the example of the diagram, "sdr" is described.

Second Method

The color gamut identification information and the dynamic range information related to the subtitle data are inserted by using the element of styling extension existing in the head of the TTML structure. In this case, insertion is performed in the text format conversion unit 107.

FIG. 11 is a diagram illustrating an exemplary structure of the styling extension (TTML Styling Extension) in this case. "ttse:colorspace" indicates the color gamut identification information, and "ITUR2020", "sRGB", or the like is described. In the example in the diagram, "ITUR2020" is described. "ttse:dynamicrange" indicates the dynamic range information, and subsequently "hdrmapped", "sdr", "Linear", or the like is described. In the example of the diagram, "sdr" is described.

Third Method

The color gamut identification information and the dynamic range information related to the subtitle data are inserted by inserting a segment including the color gamut identification information and the dynamic range information related to the subtitle data into the into the subtitle stream SS.

FIG. 12 is a diagram illustrating an exemplary structure (syntax) of a rendering segment (Rendaring_Segment( )). In this structure, respective information of "sync_byte", "segment_type", "page_id", "segment_length", "version_number", and "number_of_resion" is included. An 8-bit field in "segment_type" indicates a segment type, and here indicates the rendering segment. An 8-bit field in "segment_length" indicates a length (size) of the segment. An 8-bit field in "number_of_regions" indicates the number of regions.

Further, in this structure, the color gamut identification information and the dynamic range information related to the subtitle data are included per region. An 8-bit field in "resion_id" indicates an identifier to identify the region. An 8-bit field in "colorspace_type" indicates the color gamut identification information, and "ITUR2020", "sRGB", or the like is described. An 8-bit field in "dynamicrange_type" indicates the dynamic range information, and "hdrmapped", "sdr", "Linear", or the like is described.

Meanwhile, in the case where the subtitle stream SS includes the subtitle bitmap data, the transmission device 100 inserts the color gamut identification information and the dynamic range information related to the subtitle data into the layer of the subtitle stream SS by the third method.

Next, a case of inserting the information into a layer of the transport stream TS as the container will be described. In this case, the transmission device 100 inserts, under a program map table (PMT), a subtitle WCGHDR descriptor (subtitle_WCGHDR_descriptor) adapted to provide a new definition.

FIG. 13A is a diagram illustrating an exemplary structure (Syntax) of the subtitle WCGHDR descriptor. FIG. 13B is a diagram illustrating content of main information (Semantics) in the exemplary structure. An 8-bit field in "descriptor_tag" indicates a descriptor type, and here indicates the subtitle WCGHDR descriptor. An 8-bit field in "descriptor_length" indicates a length (size) of the descriptor, and indicates the number of following bytes as the length of the descriptor.

A 3-bit field in "color_gamut_type" indicates the color gamut identification information. For example, "001" indicates "ITUR2020" and "010" indicates "sRGB". A 3-bit field in "dynamicrange_type" indicates the dynamic range information. For example, "000" indicates "Linear", "001" indicates "hdrmapped", and "010" indicates "sdr".

Exemplary Structure of Transport Stream TS

Figure 14:
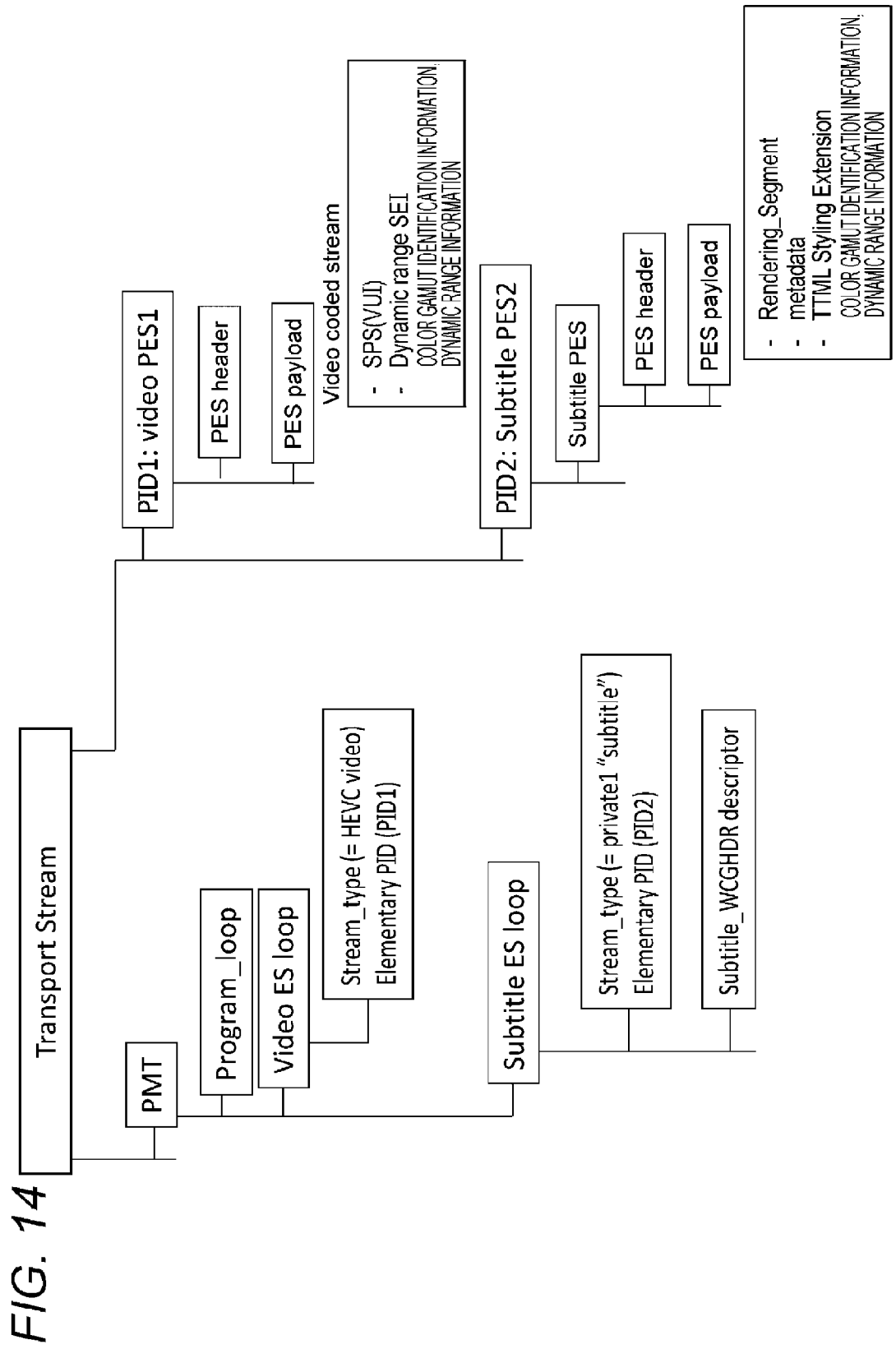
FIG. 14 is a diagram illustrating an exemplary structure of a transport stream TS.

FIG. 14 is a diagram illustrating an exemplary structure of a transport stream TS. In this exemplary structure, there is a PES packet "Video PES1" of a video stream identified by PID1. Further, in this exemplary structure, there is a PES packet "Subtitle PES2" in a subtitle stream identified by PID2.

The PES packet includes a PES header and a PES payload. In the PES packet of the video stream, a video encoded stream is inserted into the PES payload. In a VUI area of the SPS NAL unit in the access unit, the color gamut identification information and the dynamic range information of the transmission video data are inserted. Further, into the access unit, a dynamic range/SEI message with description of the color gamut identification information and the dynamic range information of the transmission video data is inserted.

Further, in the PES packet of the subtitle stream, the color gamut identification information and the dynamic range information related to the subtitle data is inserted into the element of metadata existing in the head of the TTML structure, the element of styling extension existing in the head of the TTML structure, or the rendering segment.

Further, in the transport stream TS, the program map table (PMT) is included as program specific information (PSI). The PSI is the information indicating which program each elementary stream included in the transport stream TS belongs to. In the PMT, there is a program loop describing information related to an entire program.

Further, there is an elementary stream loop having information related to each elementary stream in the PMT. In this exemplary structure, there are: a video elementary stream loop (video ES loop) corresponding to the video stream; and a subtitle elementary stream loop (Subtitle ES loop) corresponding to the subtitle stream.

In the video elementary stream loop (video ES loop), information such as a stream type and a packet identifier (PID) is arranged corresponding to the video stream, and further a descriptor describing information related to the video stream is arranged as well. A value of "Stream_type" of this video stream is set to, for example, a value indicating an HEVC video stream, and the PID information indicates PID1 assigned to the PES packet "video PES1" of the video stream.

In the subtitle elementary stream loop (Subtitle ES loop), information such as a stream type and a packet identifier (PID) is arranged corresponding to the subtitle stream, and further a descriptor describing information related to the subtitle stream arranged as well. A value of "Stream_type" of the subtitle stream is set to, for example, a value indicating a private stream, and the PID information indicates PID2 assigned to a PES packet "Subtitle PES2" of the subtitle stream. As the descriptor, the subtitle WCGHDR descriptor adapted to provide a new definition is inserted.

Operation of the transmission device 100 illustrated in FIG. 2 will be briefly described. The video data photographed and captured by the camera 102 (image data) is supplied to the video photoelectric conversion unit 103. In the video photoelectric conversion unit 103, photoelectric conversion is applied to the video data captured by the camera 102, and the transmission video data V1 is obtained.

In this case, in the case where the video data is SDR video data, photoelectric conversion is performed by using the SDR photoelectric conversion characteristic, and the SDR transmission video data (transmission video data made to have the SDR photoelectric conversion characteristic) is obtained. On the other hand, in the case where the video data is HDR video data, photoelectric conversion is performed by using the HDR photoelectric conversion characteristic, and the HDR transmission video data (transmission video data made to have the HDR photoelectric conversion characteristic) is obtained.

The transmission video data V1 obtained in the video photoelectric conversion unit 103 is supplied to the video encoder 105 after being converted from the RGB domain to the YCbCr (luminance/color difference) domain in the RGB/YCbCr conversion unit 104. The video encoder 105 applies encoding such as MPEG4-AVC or HEVC to the transmission video data V1, and generates the video stream (PES stream) VS including encoded video data.

Further, in the video encoder 105, information indicating electric-photo conversion characteristic corresponding to the photoelectric conversion characteristic held by the transmission video data V1 (transfer function), information indicating color gamut of the transmission video data V1, and meta-information indicating the reference level, and the like are inserted into the VUI area of the SPS NAL unit in the access unit (AU).

Furthermore, in the video encoder 105, the dynamic range/SEI message adapted to provide a new definition and including the information (transfer function) indicating the electric-photo conversion characteristic corresponding to the photoelectric conversion characteristic held by the transmission video data V1, the meta-information such as the reference level, and the like are inserted into the portion "SEIs" of the access unit (AU) (refer to FIG. 6).

In the subtitle generation unit 106, the text data (character code) DT is generated as the subtitle information. In the case of transmitting the subtitle text information as the subtitle data, the text data DT is supplied to the text format conversion unit 107.

In the text format conversion unit 107, conversion to subtitle text information having display timing information, namely, the TTML is performed based on the text data DT (refer to FIG. 7). The TTML is supplied to the subtitle encoder 108.

In the subtitle encoder 108, the TTML obtained in the text format conversion unit 107 is converted to various kinds of segments, and the subtitle stream SS formed of the PES packet having the segments arranged in the payload is generated.

Further, in the case of transmitting the subtitle bitmap data as the subtitle data, the text data DT generated in the subtitle generation unit 106 is supplied to the bitmap data generation unit 111.

In the bitmap data generation unit 111, the subtitle bitmap data is generated based on the text data DT. The subtitle bitmap data is supplied to the subtitle photoelectric conversion unit 112. In the subtitle photoelectric conversion unit 112, photoelectric conversion is applied to the subtitle bitmap data and the transmission bitmap data M1 is obtained.

In this case, photoelectric conversion is performed by using the SDR photoelectric conversion characteristic or the HDR photoelectric conversion characteristic. In the case where photoelectric conversion is performed by using the HDR photoelectric conversion characteristic, the luminance range is limited to the reference level of the HDR under the precondition of superposition on the HDR video. The subtitle bitmap data generated in the bitmap data generation unit 111 may be kept in the linear state and obtained as the transmission bitmap data M1.

The transmission bitmap data M1 obtained as described above is supplied to the subtitle encoder 113. In the subtitle encoder 113, the transmission bitmap data M1 and the display control information are converted to various kinds of segments, and the subtitle stream SS formed of the PES packet having the segments arranged in the payload is generated.

The video stream VS generated in the video encoder 105 is supplied to the system encoder 109. The subtitle stream SS generated in the subtitle encoder 108 or the subtitle encoder 113 is supplied to the system encoder 109. In the system encoder 109, the transport stream TS including the video stream VS and the subtitle stream SS is generated. The transport stream TS is transmitted to the reception device 200 by the transmission unit 110 over airwaves or a packet in a network.

Further, in the transmission device 100, the color gamut identification information and the dynamic range information related to the subtitle data are inserted into a layer of the subtitle stream SS and/or a layer of the transport stream TS as the container.

In the case of being inserted into the layer of the subtitle stream SS, the color gamut identification information and the dynamic range information related to the subtitle data are inserted into the element of metadata existing in the head of the TTML structure, the element of styling extension existing in the head of the TTML structure, or the rendering segment (refer to FIGS. 10A, 10B, 11, and 12).

Further, in the case of being inserted into the layer of the transport stream TS as the container, the subtitle WCGHDR descriptor having description of the color gamut identification information and the dynamic range information related to the subtitle data and adapted to provide a new definition is inserted under the program map table (PMT) (refer to FIGS. 13A and 13B).

(Configuration of Reception Device)

Figure 15:
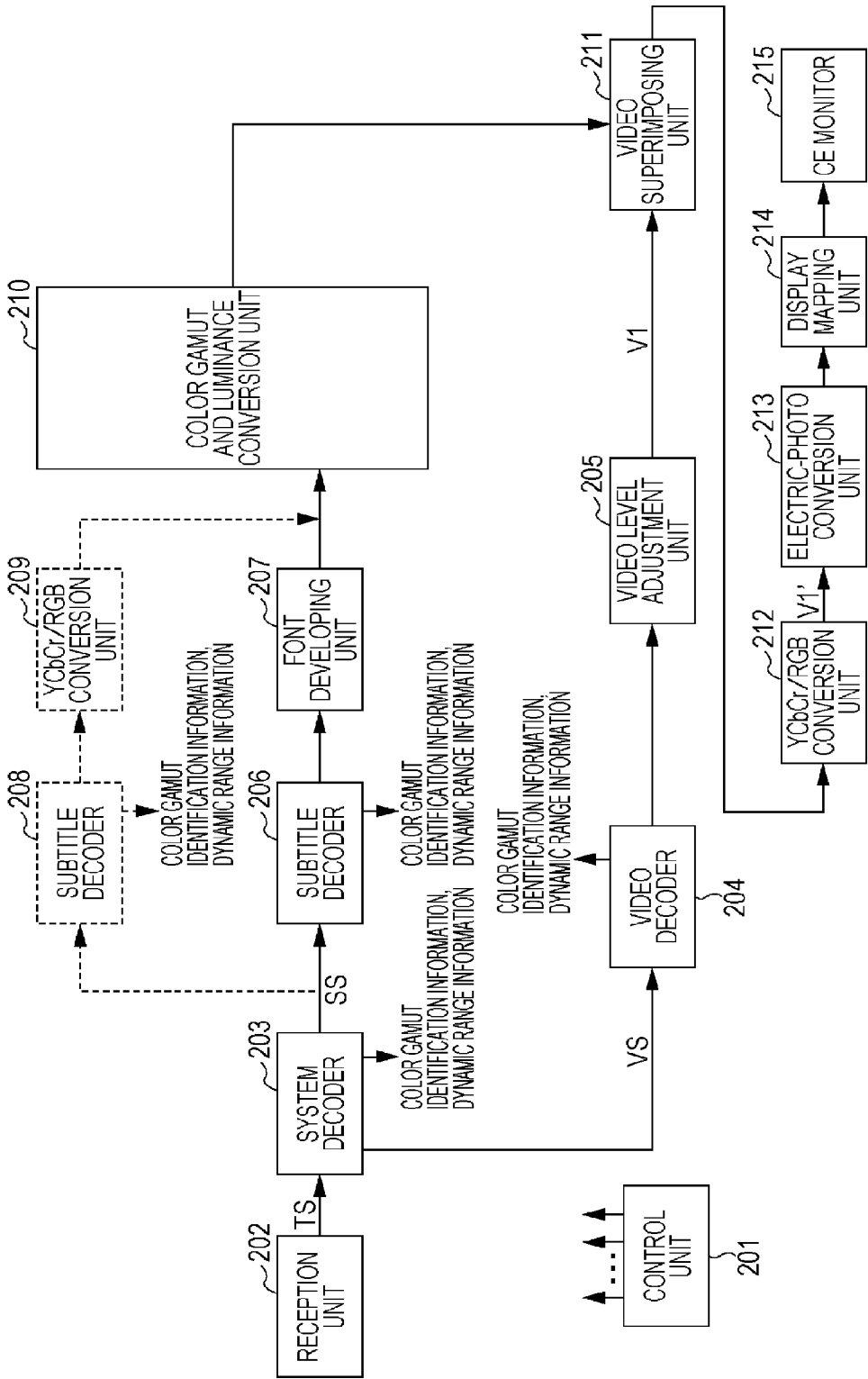
FIG. 15 is a block diagram illustrating an exemplary configuration of a reception device.

FIG. 15 is a diagram illustrating an exemplary configuration of the reception device 200. The reception device 200 includes a control unit 201, a reception unit 202, a system decoder 203, a video decoder 204, a video level adjustment unit 205, a subtitle decoder 206, a font developing unit 207, a subtitle decoder 208, a YCbCr/RGB conversion unit 209, and a color gamut/luminance conversion unit 210. Further, the reception device 200 includes a video superimposing unit 211, a YCbCr/RGB conversion unit 212, an electric-photo conversion unit 213, a display mapping unit 214, and a CE monitor 215.

The control unit 201 includes a central processing unit (CPU) and controls operation of respective units in the reception device 200 based on a control program. The reception unit 202 receives the transport stream TS transmitted from the transmission device 100 over airwaves or a packet in a network. The system decoder 203 extracts the video stream VS and the subtitle stream SS from the transport stream TS.

Further, the system decoder 203 extracts the various kinds of information inserted into the transport stream TS (container), and transmits the same to the control unit 201. In the extracted information, the subtitle WCGHDR descriptor having description of the color gamut identification information and the dynamic range information related to the subtitle data is also included (refer to FIGS. 13A and 13B).

The video decoder 204 applies decoding processing to the video stream VS extracted in the system decoder 203, and outputs the transmission video data V1. Further, the video decoder 204 extracts a parameter set and an SEI message inserted into respective access units constituting the video stream VS, and transmits the same to the control unit 201.

In the VUI area of the SPS NAL unit, information indicating the electric-photo conversion characteristic corresponding to the photoelectric conversion characteristic held by the transmission video data V1 (transfer function), information indicating color gamut of the transmission video data V1, information indicating a reference level, and the like are inserted. Further, in the SEI message, a dynamic range SEI message having the information indicating the electric-photo conversion characteristic corresponding to the photoelectric conversion characteristic held by the transmission video data V1 (transfer function), the reference level information, and the like are also included (refer to FIGS. 6A and 6B).

The subtitle decoder 206 is operated in the case where subtitle text information is transmitted as the subtitle data. The subtitle decoder 206 applies decoding processing to segment data in each of regions included in the subtitle stream SS, and obtains text data and a control code for each of the regions. Further, the subtitle decoder 206 extracts the color gamut identification information and the dynamic range information related to the subtitle data inserted into the subtitle stream SS, and transmits the same to the control unit 201.

The font developing unit 207 develops a font based on the text data and the control code in each of the regions obtained in the subtitle decoder 206, and obtains bitmap data of each of the regions. The subtitle bitmap data is obtained having the RGB domain.

The color gamut of the subtitle bitmap data is made to conform to the color gamut indicated by the above-described color gamut identification information related to the subtitle data. Further, the subtitle bitmap data is in a state such as "Linear", "sdr", "hdrmapped", and is adjusted to the state indicated by the above-described dynamic range information related to the subtitle data.

Here, "Linear" indicates the linear state without performing photoelectric conversion. "sdr" indicates that photoelectric conversion is performed by using the SDR photoelectric conversion characteristic. "hdrmapped" indicates that photoelectric conversion is performed by using the HDR photoelectric conversion characteristic and further the luminance range is limited up to the reference level of the HDR under the precondition of superposition on the HDR video.

The subtitle decoder 208 is operated in the case where the subtitle bitmap data is transmitted as the subtitle data. The subtitle decoder 208 applies decoding processing to the subtitle stream SS, and obtains the subtitle bitmap data. In this case, data included in the subtitle stream SS is transmitted to a color lookup table (CLUT), and there may be a case where CLUT output is based on the YCbCr domain.

In the case where the domain of the subtitle bitmap data obtained in the subtitle decoder 208 is YCbCr, the YCbCr/RGB conversion unit 209 performs conversion to the RGB domain. Meanwhile, in the case where the domain of the subtitle bitmap data obtained in the subtitle decoder 208 is RGB, the YCbCr/RGB conversion unit 209 outputs the subtitle bitmap data as it is.

The color gamut of the subtitle bitmap data is made to conform to the color gamut indicated by the above-described color gamut identification information related to the subtitle data. Further, the subtitle bitmap data is in a state such as "Linear", "sdr", "hdrmapped", and is adjusted to the state indicated by the above-described dynamic range information related to the subtitle data.

The color gamut/luminance conversion unit 210 adjusts, under control of the control unit 201, the color gamut of the subtitle bitmap data to the color gamut of the video data based on color gamut information of the subtitle bitmap data and color gamut information of the video data. Further, under control of the control unit 201, the color gamut/luminance conversion unit 210 adjusts a maximum level of luminance of the subtitle bitmap data so as to become the reference level or less of luminance of the video data based on the dynamic range information of the subtitle bitmap data and the dynamic range information of the video data.

Figure 16:
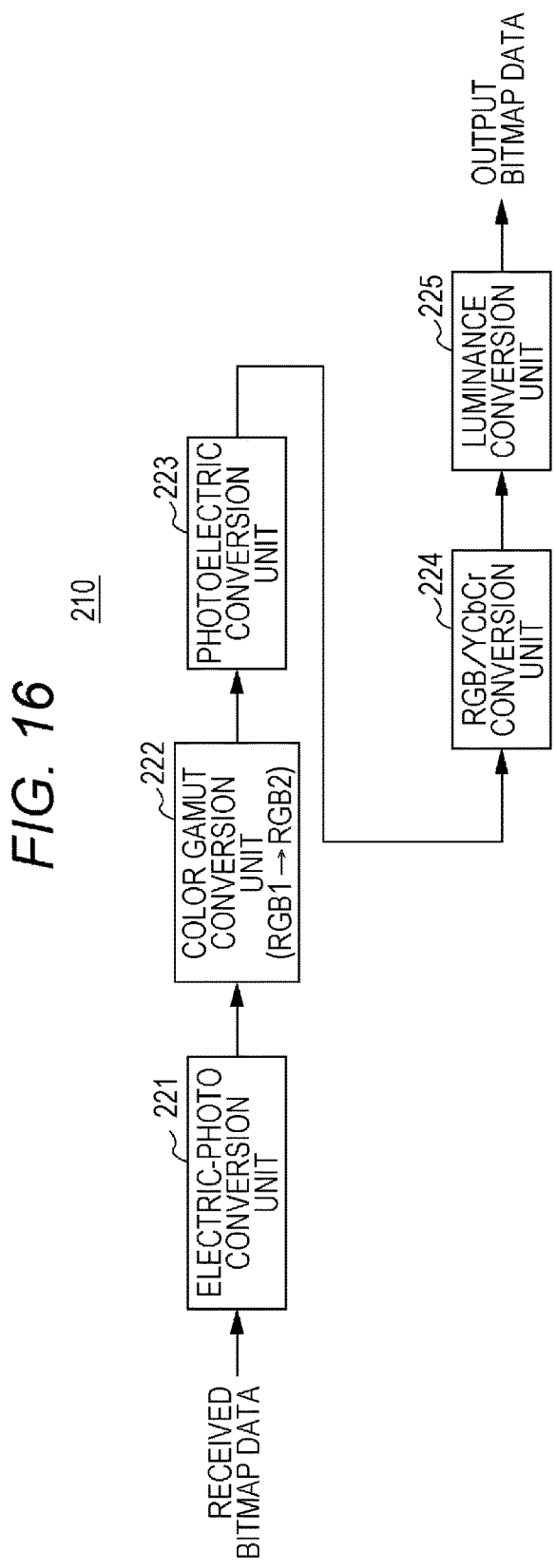
FIG. 16 is a block diagram illustrating an exemplary configuration of a color gamut/luminance conversion unit.

FIG. 16 is a diagram illustrating an exemplary configuration of the color gamut/luminance conversion unit 210. The color gamut/luminance conversion unit 210 includes an electric-photo conversion unit 221, a color gamut conversion unit 222, an HDR photoelectric conversion unit 223, an RGB/YCbCr conversion unit 224, and a luminance conversion unit 225.

The electric-photo conversion unit 221 applies electric-photo conversion to the received subtitle bitmap data. Here, when the subtitle bitmap data is in the "sdr" state, the electric-photo conversion unit 221 performs electric-photo conversion by using the SDR electric-photo conversion characteristic to make the state to the linear state. Further, when the subtitle bitmap data is in the "hdrmapped" state, the electric-photo conversion unit 221 performs electric-photo conversion by using the HDR electric-photo conversion characteristic to make the state to the linear state.

Meanwhile, when the subtitle bitmap data is in the "Linear" state, the subtitle bitmap data is already in the linear state. Therefore, the electric-photo conversion unit 221 does not perform anything substantially and outputs the received subtitle bitmap data as it is.

The color gamut conversion unit 222 adjusts, to the color gamut of the video data, the color gamut of the subtitle bitmap data output from the electric-photo conversion unit 221. For example, when the color gamut of the subtitle bitmap data is "sRGB" and the color gamut of the video data is "ITUR2020", the color gamut of the subtitle bitmap data is converted from "sRGB" to "ITUR2020". Meanwhile, when the color gamut of the subtitle bitmap data and the color gamut of the video data are the same, the color gamut conversion unit 222 does not perform anything substantially and outputs the received subtitle bitmap data as it is.

The photoelectric conversion unit 223 applies photoelectric conversion to the subtitle bitmap data output from the color gamut conversion unit 222 by using the photoelectric conversion characteristic same as the photoelectric conversion characteristic used for the video data. The RGB/YCbCr conversion unit 224 converts the subtitle bitmap data output from the photoelectric conversion unit 223 from the RGB domain to the YCbCr (luminance/color difference) domain.

The luminance conversion unit 225 performs adjustment for the subtitle bitmap data output from the RGB/YCbCr conversion unit 224 such that the maximum level of luminance of the subtitle bitmap data becomes the reference level or less of luminance of the video data, and obtains output bitmap data. In this case, in the case where the subtitle bitmap data is in the state of "hdrmapped" and the video data is the HDR, the received subtitle bitmap data is output as it is without performing any processing substantially.

Figure 17:
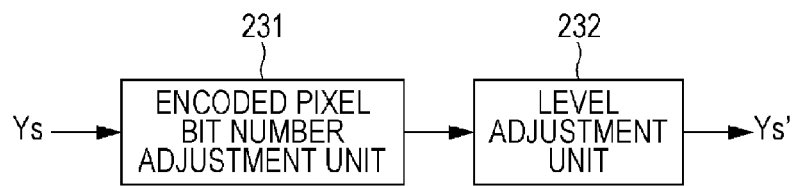
FIG. 17 is a block diagram illustrating an exemplary configuration of a configuring unit related to a luminance signal Y included in the luminance conversion unit.

FIG. 17 is a diagram illustrating an exemplary configuration of a configuring unit 225Y related to a luminance signal Y included in the luminance conversion unit 225. The configuring unit 225Y includes an encoded pixel bit number adjustment unit 231 and a level adjustment unit 232.

The encoded pixel bit number adjustment unit 231 adjusts an encoded pixel bit number of a luminance signal Ys of the subtitle bitmap data to an encoded pixel bit number of the video data. For example, when the encoded pixel bit number of the luminance signal Ys is "8 bits" and the encoded pixel bit number of the video data is "10 bits", the encoded pixel bit number of the luminance signal Ys is converted from "8 bits" to "10 bits". The level adjustment unit 232 performs adjustment such that a maximum level of the luminance signal Ys having the encoded pixel bit number adjusted become the reference level or less of luminance of the video data, and obtains an output luminance signal Ys'.

Figure 18:
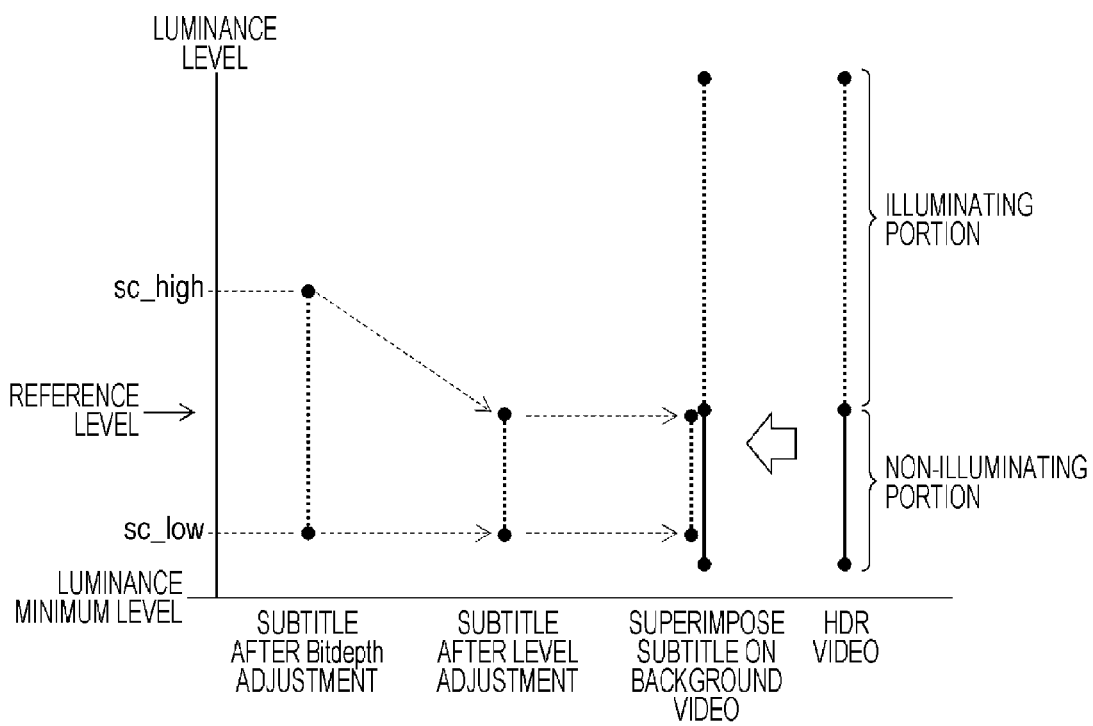
FIG. 18 is a diagram schematically illustrating operation of the luminance conversion unit.

FIG. 18 is a diagram schematically illustrating operation of the configuring unit 225Y illustrated in FIG. 17. The example in the diagram illustrates a case where the video data is the HDR. The reference level corresponds to a border between a non-illuminating portion and an illuminating portion.

The reference level exists between a maximum level (sc_high) and a minimum level (sc_low) of the luminance signal Ys after adjustment of the encoded pixel bit number. In this case, the maximum level (sc_high) is adjusted so as to become the reference level or less. Meanwhile, in this case, adopted is a method in which scale-down to the linear state is performed, for example, because a state such as white level distortion may be caused by a clip method.

By thus adjusting the level of the luminance signal Ys, the high image quality can be kept because the subtitle is prevented from being displayed illuminant on the background video when the subtitle bitmap data is superimposed on the video data.

Note that the configuring unit 225Y related to the luminance signal Ys included in the luminance conversion unit 225 has been described above (refer to FIG. 17). As for color-difference signals Cb and Cr, only the processing to adjust the encoded pixel bit number to the encoded pixel bit number of the video data is performed in the luminance conversion unit 225. For example, an entire range represented by a bit width is defined as 100% and a center value therein is defined as a reference value, and conversion from an 8-bit space to a 10-bit space is performed such that an amplitude becomes 50% in a plus direction and 50% in a minus direction from the reference value.

FIG. 19 is a flowchart illustrating an exemplary processing procedure of the color gamut/luminance conversion unit 210. Note that a description will be conveniently provided as the processing of the color gamut/luminance conversion unit 210 although the processing procedure also includes control processing related to the control unit 201.

The color gamut/luminance conversion unit 210 starts the processing in Step ST1. After that, in Step ST2, the color gamut/luminance conversion unit 210 determines whether the color gamut of the subtitle data and non-linear conversion information exist.

When the color gamut identification information and the dynamic range information related to the subtitle data are transmitted from the system decoder 203 and the subtitle decoder 206, the color gamut/luminance conversion unit 210 determines that the above-mentioned information exists. Note that non-linear conversion information constitutes the dynamic range information, and indicates which state of "Linear", "sdr", or "hdrmapped" the subtitle bitmap data is in. In the case of determining that there is the above-mentioned information, the color gamut/luminance conversion unit 210 proceeds to processing in Step ST4.

In the case of determining that the above-mentioned information does not exist, the color gamut/luminance conversion unit 210 uses, in Step ST3, the color gamut identification information and the non-linear conversion information set as the color gamut identification information and the non-linear conversion information by default. For example, the color gamut identification information set by default is "sRGB" and the non-linear conversion information set by default is "sdr". The color gamut/luminance conversion unit 210 proceeds to the processing in Step ST4 after the processing in Step ST3.

In Step ST4, the color gamut/luminance conversion unit 210 applies electric-photo conversion to the subtitle bitmap data in accordance with the non-linear conversion information so as to make the linear state. Next, in Step ST5, the color gamut/luminance conversion unit 210 adjusts the color gamut of the subtitle bitmap data to the color gamut of the video data. After that, in Step ST6, the color gamut/luminance conversion unit 210 applies, to the subtitle bitmap data, same photoelectric conversion applied to the video data, and adjusts the photoelectric conversion characteristic of the subtitle bit map data to the photoelectric conversion characteristic applied to the video data.

Next, in Step ST7, the color gamut/luminance conversion unit 210 adjusts the encoded pixel bit number of the subtitle bitmap data to the encoded pixel bit number of the video data. Next, in Step ST8, the color gamut/luminance conversion unit 210 determines whether any countermeasure for HDR has been taken relative to a luminance level of the subtitle bitmap data. When the non-linear conversion information indicates "hdrmapped", the color gamut/luminance conversion unit 210 determines that the countermeasure for HDR has been taken.

When no countermeasure for HDR has been taken, the color gamut/luminance conversion unit 210 determines whether the video data is HDR in Step ST9. When the video data is the HDR, the color gamut/luminance conversion unit 210 adjusts, in Step ST10, the maximum level of luminance of the subtitle bitmap data so as to become the reference level or less of luminance of the video data, and then outputs the subtitle bitmap data as output bitmap data. After that, the color gamut/luminance conversion unit 210 finishes the processing in Step ST11.

When the video data is not the HDR in Step ST9, the color gamut/luminance conversion unit 210 outputs the subtitle bitmap data as it is as the output bitmap data in Step ST12. After that, the color gamut/luminance conversion unit 210 finishes the processing in Step ST11.

Further, when the countermeasure for HDR has been taken in Step ST8, the color gamut/luminance conversion unit 210 determines whether the video data is the HDR in Step ST13. When the video data is not the HDR, the color gamut/luminance conversion unit 210 adjusts, in Step ST10, the maximum level of luminance of the subtitle bitmap data so as to become the reference level or less of luminance of the video data, and outputs this subtitle bitmap data as the output bitmap data. After that, the color gamut/luminance conversion unit 210 finishes the processing in Step ST11.

When the video data is the HDR in Step ST13, the color gamut/luminance conversion unit 210 outputs the subtitle bitmap data as it is as the output bitmap data in Step ST12. After that, the color gamut/luminance conversion unit 210 finishes the processing in Step ST11.

Referring back to FIG. 15, the video level adjustment unit 205 adjusts the luminance level in a subtitle superimposed region (region) of the transmission video data V1 output from the video decoder 204. With this adjustment, the subtitle (caption) is prevented from being obstructed by a high luminance portion of the background video (background image), and readability of the subtitle can be improved.

Figure 20A:
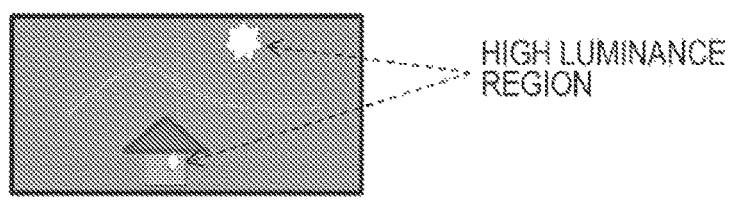
FIGS. 20A to 20C are explanatory diagrams to describe luminance level adjustment for video data.
Figure 20B:
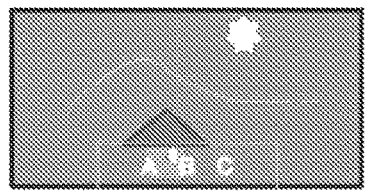

FIG. 20A is a diagram illustrating an exemplary image display based on the video data before adjusting the luminance level. In this background image, there is a high luminance region. FIG. 20B is a diagram illustrating an exemplary image display in the case of superimposing, on the video data before adjusting the luminance level, the subtitle bitmap data having the luminance level adjusted as described above. In this case, the subtitle (caption) can be hardly read because the high luminance portion of the background image obstructs the subtitle.

Figure 20C:
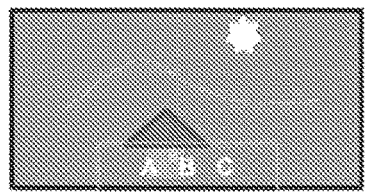

FIG. 20C is a diagram illustrating an exemplary image display in the case of adjusting the luminance level in the subtitle superimposed region (region) of the video data so as to become lower than the maximum level of luminance of the subtitle bitmap data having the luminance level adjusted as described above. In this case, the subtitle (caption) is not obstructed by the high luminance portion of the background image and the subtitle can be easily read.

Figure 21:
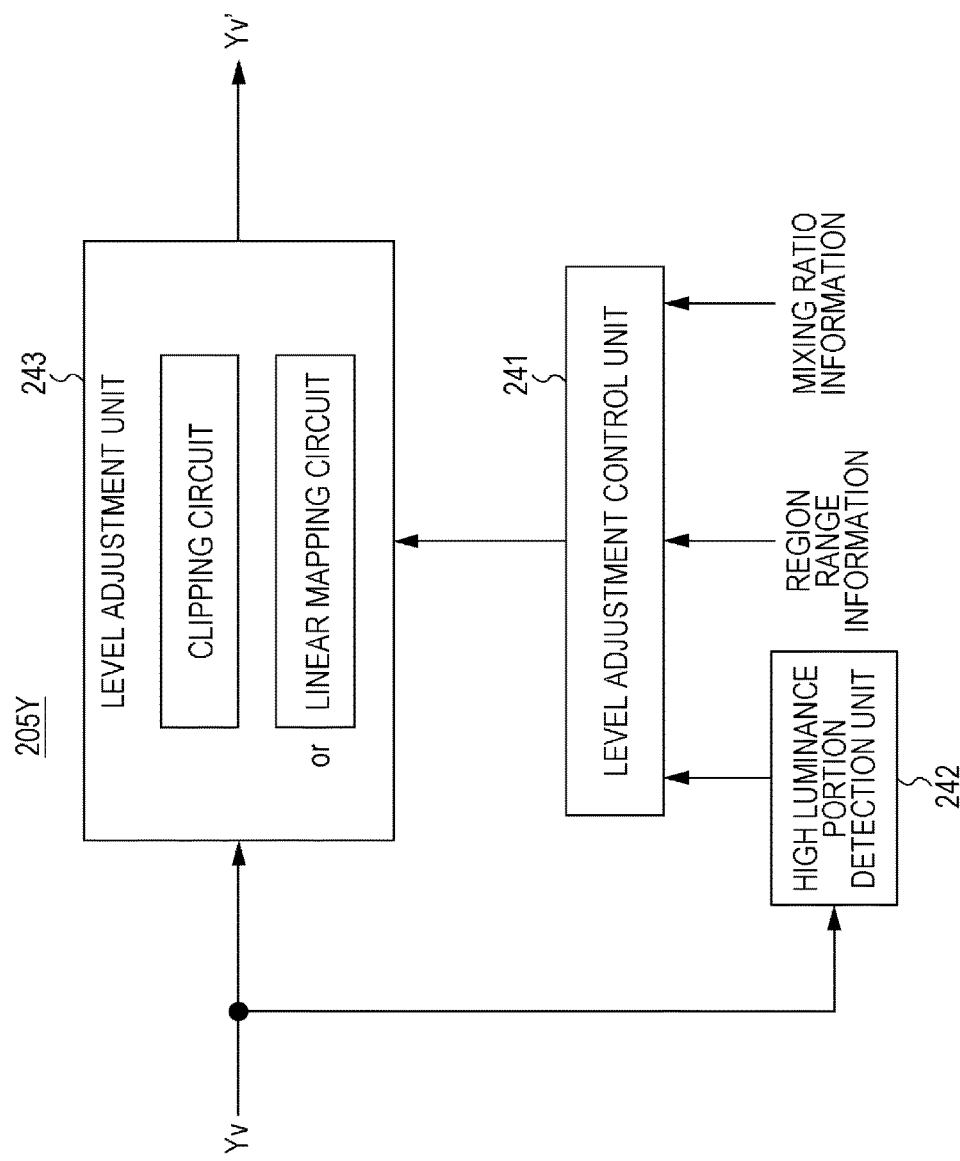
FIG. 21 is a block diagram illustrating an exemplary structure of a configuring unit included in a video level adjustment unit and related to a luminance signal Yv.

FIG. 21 is a diagram illustrating an exemplary structure of the configuring unit 205Y included in the video level adjustment unit 205 and related to a luminance signal Yv. Meanwhile, as for the color-difference signals Cb and Cr, the video level adjustment unit 205 outputs the received data as it is although a detailed description therefor is omitted.

The configuring unit 205Y includes a level adjustment control unit 241, a high luminance portion detection unit 242, and a level adjustment unit 243. The high luminance portion detection unit 242 detects, per pixel, a high luminance portion exceeding the reference level from the received luminance signal Yv, and transmits a detection signal to the level adjustment control unit 241.

For the received luminance signal Yv, the level adjustment unit 243 obtains an output luminance signal Yv' by adjusting, by using a clipping circuit or a linear mapping circuit, a luminance level of the received luminance signal Yv so as to become lower than the maximum level of luminance of the above-described subtitle bitmap data having the luminance adjusted.

The level adjustment control unit 241 controls operation of the level adjustment unit 243 based on detection output of the high luminance portion detection unit 242, region range information, and mixing ratio information of the video data. In other words, the level adjustment control unit 241 performs control such that the level of the luminance signal Yv is adjusted by the level adjustment unit 243 only for a pixel in the high luminance portion.

Further, the level adjustment control unit 241 performs control such that the level of the luminance signal Yv is adjusted by the level adjustment unit 243 only for a pixel located in the subtitle superimposed region (region). Furthermore, the level adjustment control unit 241 performs control such that the level of the luminance signal Yv is adjusted by the level adjustment unit 243 only in the case where the mixing ratio of the video data exceeds a threshold value.

Figure 22:
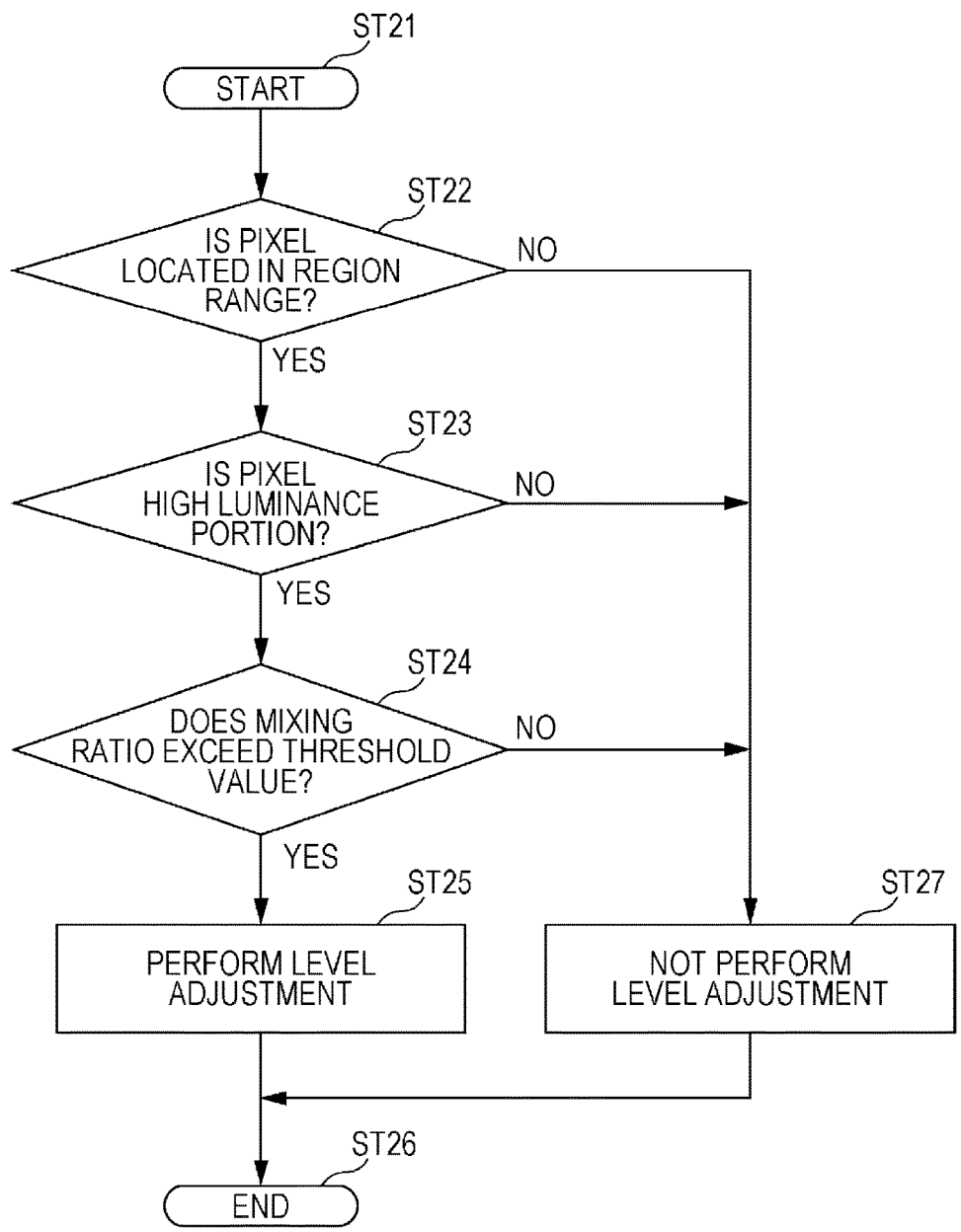
FIG. 22 is a flowchart illustrating an exemplary processing procedure for each pixel in the configuring unit related to the luminance signal Yv.

FIG. 22 is a flowchart illustrating an exemplary processing procedure performed for each pixel in the configuring unit 205Y illustrated in FIG. 21. The configuring unit 205Y starts the processing in Step ST21. After that, in Step ST22, the configuring unit 205Y determines whether the pixel is located in the region range. In the case where the pixel is located in the region range, the configuring unit 205Y determines, in Step ST23, whether the pixel is the high luminance portion.

When the pixel is in the high luminance portion, the configuring unit 205Y determines, in Step ST24, whether the mixing ratio exceeds the threshold value. In the case where the mixing ratio exceeds the threshold value, the configuring unit 205Y adjusts, in Step ST25, the luminance level of the received luminance signal Yv so as to become lower than the maximum level of luminance of the subtitle bitmap data having the luminance adjusted as described above, and obtains an output luminance signal Yv'. After that, the configuring unit 205Y finishes the processing in Step ST26.

When the pixel is not located in the region range in Step ST22, when the pixel is not the high luminance portion in Step ST23, or when the mixing ratio does not exceed the threshold value in Step ST24, the configuring unit 205Y obtains the output luminance signal Yv' as it is without performing level adjustment for the received luminance signal Yv in Step ST27. After that, the configuring unit 205Y finishes the processing in Step ST26.

Referring back to FIG. 15, the video superimposing unit 211 superimposes the subtitle bitmap data output from the color gamut/luminance conversion unit 210 on the transmission video data V1 output from the video level adjustment unit 205. In this case, the video superimposing unit 211 mixes the subtitle bitmap data with the transmission video data V1 at a predetermined ratio.

The YCbCr/RGB conversion unit 212 coverts the transmission video data V1' superimposed with the subtitle bitmap data from the YCbCr (luminance/color difference) domain to the RGB domain. In this case, the YCbCr/RGB conversion unit 212 performs conversion by using a conversion system corresponding to the color gamut based on the color gamut identification information.

The electric-photo conversion unit 213 applies electric-photo conversion to the transmission video data V1' converted to the RGB domain by using the electric-photo conversion characteristic corresponding to the photoelectric conversion characteristic applied thereto, and obtains display video data to display an image. The display mapping unit 214 performs display luminance adjustment for the display video data in accordance with maximum luminance display capability and the like of a CE monitor 215. The CE monitor 215 displays an image based on the display video data subjected to the above-described display luminance adjustment. The CE monitor 215 is formed of, for example, a liquid crystal display (LCD), an organic electroluminescence display (organic EL display) or the like.

Operation of the reception device 200 illustrated in FIG. 15 will be briefly described. In the reception unit 202, the transport stream TS transmitted from the transmission device 100 over airwaves or a packet in a network is received. The transport stream TS is supplied to the system decoder 203. In the system decoder 203, the video stream VS and the subtitle stream SS are extracted from the transport stream TS.

Further, in the system decoder 203, various kinds of information inserted into the transport stream TS (container) are extracted and transmitted to the control unit 201. In the extracted information, the subtitle WCGHDR descriptor having description of the color gamut identification information and the dynamic range information related to the subtitle data is also included (refer to FIGS. 13A and 13B).

The video stream VS extracted in the system decoder 203 is supplied to the video decoder 204. In the video decoder 204, decoding processing is applied to the video stream VS and the transmission video data V1 is obtained.

Further, in the video decoder 204, the parameter set and the SEI message inserted into the respective access units constituting the video stream VS are extracted and transmitted to the control unit 201. In the VUI area of the SPS NAL unit, information indicating the electric-photo conversion characteristic corresponding to the photoelectric conversion characteristic held by the transmission video data V1 (transfer function), information indicating color gamut of the transmission video data V1, information indicating a reference level, and the like are inserted. Further, in the SEI message, a dynamic range SEI message having the information indicating the electric-photo conversion characteristic corresponding to the photoelectric conversion characteristic held by the transmission video data V1 (transfer function), the reference level information, and the like are also included (refer to FIGS. 6A and 6B).

The subtitle stream SS extracted in the system decoder 203 is supplied to the subtitle decoder 206 in the case where subtitle text information is transmitted as the subtitle data. In the subtitle decoder 206, decoding processing is applied to segment data in each of the regions included in the subtitle stream SS, and the text data and the control code in each of the regions are obtained.

The text data and the control code in each of the regions are supplied to the font developing unit 207. In the font developing unit 207, the font is developed based on the text data and the control code in each of the regions, and the bitmap data of each of the regions is obtained. The subtitle bitmap data is supplied to the color gamut/luminance conversion unit 210.

Further, the subtitle stream SS extracted in the system decoder 203 is supplied to the subtitle decoder 208 in the case where the subtitle bitmap data is transmitted as the subtitle data. In the subtitle decoder 208, decoding processing is applied to the subtitle stream SS and the subtitle bitmap data is obtained. The subtitle bitmap data is converted from the YCbCr domain to the RGB domain in the YCbCr/RGB conversion unit 209, and supplied to the color gamut/luminance conversion unit 210.

In the color gamut/luminance conversion unit 210, the color gamut of the subtitle bitmap data is adjusted to the color gamut of the video data based on the color gamut information of the subtitle bitmap data and the color gamut information of the video data. Further, in the color gamut/luminance conversion unit 210, the maximum level of luminance of the subtitle bitmap data is adjusted so as to become the reference level or less of luminance of the video data based on the dynamic range information of the subtitle bitmap data (non-linear conversion information) and the dynamic range information of the video data (reference level information and information indicating whether HDR or not).

The transmission video data V1 obtained in the video decoder 204 is supplied to the video level adjustment unit 205. In the video level adjustment unit 205, the luminance level in the subtitle superimposed region (region) of the transmission video data V1 is adjusted. In this case, when the mixing ratio of the video data exceeds the threshold value, the luminance level in the subtitle superimposed region (region) of the video data is adjusted so as to become lower than the maximum level of luminance of the subtitle bitmap data having the luminance level adjusted.

In the video level adjustment unit 205, the transmission video data V1 having the luminance level adjusted is supplied to the video superimposing unit 211. Further, the subtitle bitmap data having the color gamut and the luminance adjusted in the color gamut/luminance conversion unit 210 are supplied to the video superimposing unit 211. In the video superimposing unit 211, the subtitle bitmap data is superimposed on the transmission video data V1. In this case, the subtitle bitmap data is mixed with the transmission video data V1 at the predetermined ratio.

The transmission video data V1' obtained in the video superimposing unit 211 and superimposed with the bitmap data is converted from the YCbCr (luminance/color difference) domain to the RGB domain in the YCbCr/RGB conversion unit 212, and then supplied to the electric-photo conversion unit 213. In the electric-photo conversion unit 213, electric-photo conversion is applied to the transmission video data V1' by using the electric-photo conversion characteristic corresponding to the photoelectric conversion characteristic applied thereto, and the display video data to display the image is obtained.

The display video data is supplied to the display mapping unit 214. In the display mapping unit 214, display luminance adjustment is performed for the display video data in accordance with the maximum luminance display capacity and the like of the CE monitor 215. The display video data thus subjected to display luminance adjustment is supplied to the CE monitor 215. In the CE monitor 215, an image is displayed based on the display video data.

As described above, in the transmitting/receiving system 10 illustrated in FIG. 1, the reception device 200 adjusts the color gamut of the subtitle bitmap data to the color gamut of the video data, and further adjusts the maximum level of luminance of the subtitle bitmap data so as to become the reference level or less of luminance of the video data. Therefore, high image quality can be kept when the subtitle data is superimposed on the video data.

Further, in the transmitting/receiving system 10 illustrated in FIG. 1, when the mixing ratio of the video data exceeds the threshold value, the reception device 200 adjusts the luminance level in the subtitle superimposed region (region) of the video data so as to become lower than the maximum level of luminance of the subtitle bitmap data having the luminance level adjusted. Therefore, the subtitle can be prevented from being obstructed by the high luminance portion of the background video (background image), and readability of the subtitle can be improved.

<2. Modified Example>

In the above-described embodiment, note that the description has been provided for the example in which the container is the transport stream (MPEG-2 TS). However, the transport is not limited to the TS in the present technology, and even in the case of adopting other packets such as ISO base media file format (ISOBMFF) and MPEG media transport (MMT), a video layer can be achieved in the same method. Further, the constituent of the subtitle stream is not necessarily limited to the PES packet arranged on a multiplexed payload after converting the TTML into the segments as described above. The matters disclosed in the present technology can be also achieved by directly arranging the TTML on the PES packet or a section portion arranged on the above-described multiplexed payload.

Further, the present technology can also have following configurations.

(1) A reception device includes:
circuitry configured to
receive a video stream and a subtitle stream;
process the video stream to obtain video data of a video;
process the subtitle stream to obtain subtitle bitmap data of a subtitle bitmap image;
adjust a color gamut of the subtitle bitmap data to a color gamut of the video data, the color gamut of the subtitle bitmap data being adjusted based on color gamut identification information of the subtitle bitmap data and color gamut identification information of the video data; and
superimpose, on the video, the color gamut adjusted subtitle bitmap image.

(2) The reception device according to above (1), in which the circuitry is configured to obtain the color gamut identification information of the subtitle bitmap data from a layer of the subtitle stream or a layer of a container that includes the video stream and the subtitle stream.

(3) The reception device according to above (2), in which the color gamut identification information of the subtitle bitmap data is set to a default range when the color gamut identification information of the subtitle bitmap data is not obtained from the layer of the subtitle stream or the layer of the container.

(4) The reception device according to any one of above (1) to (3), in which the circuitry is configured to adjust a maximum level of luminance of the subtitle bitmap data to a reference level or less of luminance of the video data, the maximum level of the luminance being adjusted based on dynamic range information of the subtitle bitmap data and dynamic range information of the video data.

(5) The reception device according to above (4), in which the circuitry is configured to obtain the dynamic range information of the subtitle bitmap data from a layer of the subtitle stream or a layer of a container that includes the video stream and the subtitle stream.

(6) The reception device according to above (5), in which the dynamic range of the subtitle bitmap data is set to a default range when the dynamic range information of the subtitle bitmap data is not obtained from the layer of the subtitle stream or the layer of the container.

(7) The reception device according to any one of above (4) to (6), in which the circuitry is configured to adjust a luminance level in a region of the video in which the color gamut adjusted subtitle bitmap image is superimposed.

(8) The reception device according to above (7), in which the circuitry is configured to decrease the luminance level of the video data corresponding to a high luminance pixel existing in the region of the video in which the color gamut adjusted subtitle bitmap image is superimposed.

(9) The reception device according to above (7) or (8), in which the circuitry is configured to adjust the luminance level of the video data when a mixing ratio of the video data exceeds a threshold value.

(10) A receiving method including:
receiving, by circuitry, a video stream and a subtitle stream;
processing the video stream to obtain video data of a video;
processing the subtitle stream to obtain subtitle bitmap data of a subtitle bitmap image;
adjusting a color gamut of the subtitle bitmap data to a color gamut of the video data, the color gamut of the subtitle bitmap data being adjusted based on color gamut identification information of the subtitle bitmap data and color gamut identification information of the video data; and
superimposing, on the video, the color gamut adjusted subtitle bitmap image.

(11) A reception device including:
circuitry configured to
receive a video stream and a subtitle stream;
process the video stream to obtain video data of a video;
process the subtitle stream to obtain subtitle bitmap data of a subtitle bitmap image;
adjust a maximum level of luminance of the subtitle bitmap data to a reference level or less of luminance of the video data, the maximum level of the luminance of the subtitle bitmap data being adjusted based on dynamic range information of the subtitle bitmap data and dynamic range information of the video data; and
superimpose, on the video, the luminance adjusted subtitle bitmap image.

(12) The reception device according to above (11), in which the circuitry is configured to obtain the dynamic range information of the subtitle bitmap data from a layer of the subtitle stream or a layer of a container including the video stream and the subtitle stream.

(13) The reception device according to above (12), in which the dynamic range of the subtitle bitmap data is set to a default range when the dynamic range information of the subtitle bitmap data is not obtained from the layer of the subtitle stream or the layer of the container.

(14) The reception device according to any one of above (11) to (13), in which the circuitry is configured to adjust a luminance level in a region of the video in which the luminance adjusted subtitle bitmap image is superimposed

(15) The reception device according to above (14), in which the circuitry is configured to decrease the luminance level of the video corresponding to a high luminance pixel existing in the region in which the luminance adjusted subtitle bitmap image is superimposed superimposed region.

(16) The reception device according to above (14) or (15), in which the circuitry is configured to adjust the luminance level of the video data when a mixing ratio of the video data exceeds a threshold value.

(17) A receiving method including:
receiving, by circuitry, a video stream and a subtitle stream;
processing the video stream to obtain video data of a video;
processing the subtitle stream to obtain subtitle bitmap data of a subtitle bitmap image;
adjusting a maximum level of luminance of the subtitle bitmap data to a reference level or less of luminance of the video data, the maximum level of the luminance of the subtitle bitmap data being adjusted based on dynamic range information of the subtitle bitmap data and dynamic range information of the video data; and
superimposing, on the video, the luminance adjusted subtitle bitmap image.

(18) A transmission device including:
circuitry configured to
transmit a video stream and a subtitle stream; and
insert color gamut identification information and/or dynamic range information related to subtitle data, included in the subtitle stream, into a layer of the subtitle stream and/or a layer of a container including the video stream and the subtitle stream (19) The transmission device according to above (18), wherein the subtitle data is subtitle text information in a predetermined format.

(20) A transmitting method including:
transmitting, by circuitry, a video stream and a subtitle stream; and
inserting color gamut identification information and/or dynamic range information related to subtitle data, included in the subtitle stream, into a layer of the subtitle stream and/or a layer of a container including the video stream and the subtitle stream.

(21) A reception device includes:
a reception unit adapted to receive a container in a predetermined format in which a video stream having video data and a subtitle stream having subtitle data are included;
a video decoding unit adapted to apply decoding processing to the video stream to obtain video data;
a subtitle decoding unit adapted to apply decoding processing to the subtitle stream to obtain subtitle bitmap data;
a color gamut processing unit adapted to adjust color gamut of the subtitle bitmap data to color gamut of the video data based on color gamut identification information of the subtitle bitmap data and color gamut identification information of the video data; and
a video superimposing unit adapted to superimpose, on the video data, the subtitle bitmap data having the color gamut adjusted.

(22) The reception device according to above (21), wherein the color gamut processing unit uses, as the color gamut identification information of the subtitle bitmap data, color gamut identification information obtained from a layer of the subtitle stream or a layer of the container.

(23) The reception device according to above (22), wherein the color gamut processing unit uses, as the color gamut identification information of the subtitle bitmap data, color gamut identification information set by default when the color gamut identification information of the subtitle bitmap data is not obtained from the layer of the subtitle stream or the layer of the container.

(24) The reception device according to any one of above (21) to (23), further including a luminance processing unit adapted to adjust a maximum level of luminance of the subtitle bitmap data so as to become a reference level or less of luminance of the video data based on dynamic range information of the subtitle bitmap data and dynamic range information of the video data.

(25) The reception device according to above (24), wherein the luminance processing unit uses, as the dynamic range information of the subtitle bitmap data, dynamic range information obtained from a layer of the subtitle stream or a layer of the container.

(26) The reception device according to above (25), wherein the luminance processing unit uses, as the dynamic range of the subtitle bitmap data, dynamic range information set by default when the dynamic range information of the subtitle bitmap data is not obtained from the layer of the subtitle stream or layer of container.

(27) The reception device according to any one of above (24) to (26), further including a video level adjustment unit interposed between the video decoding unit and the video superimposing unit, and adapted to adjust a luminance level in a subtitle data superimposed region of the video data.

(28) The reception device according to above (27), wherein the video level adjustment unit performs adjustment so as to decrease a luminance level of video data corresponding to a high luminance pixel existing in the subtitle data superimposed region.

(29) The reception device according to above (27) or (28), wherein the video level adjustment unit adjusts the luminance level of the video data when a mixing ratio of the video data in the video superimposing unit exceeds a threshold value.

(30) A receiving method including:
receiving, by a reception unit, a container in a predetermined format in which a video stream having video data and a subtitle stream having subtitle data are included;
applying decoding processing to the video stream to obtain video data;
applying decoding processing to the subtitle stream to obtain subtitle bitmap data;
adjusting color gamut of the subtitle bitmap data to color gamut of the video data based on color gamut identification information of the subtitle bitmap data and color gamut identification information of the video data; and
superimposing, on the video data, the subtitle bitmap data having the color gamut adjusted.

(31) A reception device including:
a reception unit adapted to receive a container in a predetermined format in which a video stream having video data and a subtitle stream having subtitle data are included;
a video decoding unit adapted to apply decoding processing to the video stream to obtain video data;
a subtitle decoding unit adapted to apply decoding processing to the subtitle stream to obtain subtitle bitmap data;
a luminance processing unit adapted to adjust a maximum level of luminance of the subtitle bitmap data so as to become a reference level or less of luminance of the video data based on dynamic range information of the subtitle bitmap data and dynamic range information of the video data; and
a video superimposing unit adapted to superimpose, on the video data, the subtitle bitmap data having the luminance adjusted.

(32) The reception device according to above (31), wherein the luminance processing unit uses, as the dynamic range information of the subtitle bitmap data, dynamic range information obtained from a layer of the subtitle stream or a layer of the container.

(33) The reception device according to above (32), wherein the luminance processing unit uses, as the dynamic range of the subtitle bitmap data, dynamic range information set by default when the dynamic range information of the subtitle bitmap data is not obtained from the layer of the subtitle stream or the layer of the container.

(34) The reception device according to any one of above (31) to (33), further including a video level adjustment unit interposed between the video decoding unit and the video superimposing unit, and adapted to adjust a luminance level in a subtitle data superimposed region of the video data.

(35) The reception device according to above (34), wherein the video level adjustment unit performs adjustment so as to decrease a luminance level of video data corresponding to a high luminance pixel existing in the subtitle data superimposed region.

(36) The reception device according to above (34) or (35), wherein the video level adjustment unit adjusts the luminance level of the video data when a mixing ratio of the video data in the video superimposing unit exceeds a threshold value.

(37) A receiving method including:
receiving, by a reception unit, a container in a predetermined format in which a video stream having video data and a subtitle stream having subtitle data are included;
applying decoding processing to the video stream to obtain video data;
applying decoding processing to the subtitle stream to obtain subtitle bitmap data;
adjusting a maximum level of luminance of the subtitle bitmap data so as to become a reference level or less of luminance of the video data based on dynamic range information of the subtitle bitmap data and dynamic range information of the video data; and
superimposing, on the video data, the subtitle bitmap data having the luminance adjusted.

(38) A transmission device including:
a transmission unit adapted to transmit a container in a predetermined format in which a video stream having video data and a subtitle stream having subtitle data are included; and
an information inserting unit adapted to insert color gamut identification information and/or dynamic range information related to the subtitle data into a layer of the subtitle stream and/or a layer of the container.

(39) The transmission device according to above (38), wherein the subtitle data is subtitle text information in a predetermined format.

(40) A transmitting method including:
transmitting, by a transmission unit, a container in a predetermined format in which a video stream having video data and a subtitle stream having subtitle data are included; and
inserting color gamut identification information and/or dynamic range information related to the subtitle data into a layer of the subtitle stream and/or a layer of the container.

A main characteristic of the present technology is that high image quality can be kept when the subtitle data is superimposed on the video data by adjusting the color gamut of the subtitle bitmap data to the color gamut of the video data and further adjusting the maximum level of luminance of the subtitle bitmap data so as to become the reference level or less of luminance of the video data (refer to FIGS. 15 to 19).

Further, another main characteristic of the present technology is that the subtitle can be prevented from being obstructed by the high luminance portion of the background video and readability of the subtitle can be improved by adjusting the luminance level of the video data so as to become lower than the maximum level of luminance of the subtitle bitmap data when the mixing ratio of the video data exceeds the threshold value (refer to FIGS. 15 and 20A to 22).

REFERENCE SIGNS LIST

10 Image transmitting/receiving system
100 Transmission device
101 Control unit
102 Camera
103 Video photoelectric conversion unit
104 RGB/YCbCr conversion unit
105 Video encoder
106 Subtitle generation unit
107 Text format conversion unit
108 Subtitle encoder
109 System encoder
110 Transmission unit
111 Bitmap data generation unit
112 Subtitle photoelectric conversion unit
113 Subtitle encoder
200 Reception device
201 Control unit
202 Reception unit
203 System decoder
204 Video decoder
205 Video level adjustment unit
205Y Configuring unit
206 Subtitle encoder
207 Font developing unit
208 Subtitle encoder
209 YCbCr/RGB conversion unit
210 Color gamut/luminance conversion unit
211 Video superimposing unit
212 YCbCr/RGB conversion unit
213 Electric-photo conversion unit
214 Display mapping unit
215 CE monitor
221 Electric-photo conversion unit
222 Color gamut conversion unit
223 Photoelectric conversion unit
224 RGB/YCbCr conversion unit
225 Luminance conversion unit
225Y Configuring unit
231 Encoded pixel bit number adjustment unit
232 Level adjustment unit
241 Level adjustment control unit
242 High luminance detection unit
243 Level adjustment unit

The invention claimed is:

1. A reception device comprising:
circuitry configured to
receive a video stream and a subtitle stream;
process the video stream to obtain video data of a video;
process the subtitle stream to obtain subtitle bitmap data of a subtitle bitmap image;
obtain color gamut identification information of the subtitle bitmap data that is provided in the subtitle stream or a container that includes the video stream and the subtitle stream;
generate a color gamut adjusted subtitle bitmap image by adjusting a color gamut of the subtitle bitmap data to a color gamut of the video data, the color gamut of the subtitle bitmap data being adjusted based on the color gamut identification information of the subtitle bitmap data and color gamut identification information of the video data; and
when a pixel of a region of the video on which the color gamut adjusted subtitle bitmap image is to be superimposed corresponds to a high luminance portion and a mixing ratio of the video data exceeds a threshold value,
decrease an original luminance level of the pixel to become a decreased luminance level, and
superimpose, on the video with the pixel having the decreased luminance level, the color gamut adjusted subtitle bitmap image.

2. The reception device according to claim 1, wherein the circuitry is configured to adjust a maximum level of luminance of the subtitle bitmap data to a reference level or less of luminance of the video data, the maximum level of the luminance being adjusted based on dynamic range information of the subtitle bitmap data and dynamic range information of the video data.

3. The reception device according to claim 2, wherein the circuitry is configured to obtain the dynamic range information of the subtitle bitmap data from the subtitle stream or the container that includes the video stream and the subtitle stream.

4. The reception device according to claim 2, wherein the dynamic range of the subtitle bitmap data is set to a default range when the dynamic range information of the subtitle bitmap data is not available from the subtitle stream or the container that includes the video stream and the subtitle stream.

5. The reception device according to claim 1, wherein the circuitry is configured to, when the pixel of the region of the video does not correspond to the high luminance portion or the mixing ratio of the video data does not exceed the threshold value,
superimpose, on the video with the pixel having the original luminance level, the color gamut adjusted subtitle bitmap image.

6. A reception device comprising:
circuitry configured to
receive a video stream and a subtitle stream;
process the video stream to obtain video data of a video;
process the subtitle stream to obtain subtitle bitmap data of a subtitle bitmap image;
obtain dynamic range information of the subtitle bitmap data that is provided in the subtitle stream or a container that includes the video stream and the subtitle stream;
generate an luminance adjusted subtitle bitmap image by adjusting a maximum level of luminance of the subtitle bitmap data to a reference level or less of luminance of the video data, the maximum level of the luminance of the subtitle bitmap data being adjusted based on the dynamic range information of the subtitle bitmap data and dynamic range information of the video data; and
when a pixel of a region of the video on which the luminance adjusted subtitle bitmap image is to be superimposed corresponds to a high luminance portion and a mixing ratio of the video data exceeds a threshold value, decrease an original luminance level of the pixel to become a decreased luminance level, and superimpose, on the video with the pixel having the decreased luminance level, the luminance adjusted subtitle bitmap image.

7. The reception device according to claim 6, wherein the circuitry is configured to adjust a color gamut of the subtitle bitmap data to a color gamut of the video data, the color gamut of the subtitle bitmap data being adjusted based on color gamut identification information of the subtitle bitmap data and color gamut identification information of the video data.

8. The reception device according to claim 7, wherein the circuitry is configured to obtain the color gamut identification information of the subtitle bitmap data from the subtitle stream or the container that includes the video stream and the subtitle stream.

9. The reception device according to claim 7, wherein the color gamut identification information of the subtitle bitmap data is set to a default range when the color gamut identification information of the subtitle bitmap data is not available from the subtitle stream or the container that includes the video stream and the subtitle stream.

10. The reception device according to claim 6, wherein the circuitry is configured to, when the pixel of the region of the video does not correspond to the high luminance portion or the mixing ratio of the video data does not exceed the threshold value, superimpose, on the video with the pixel having the original luminance level, the luminance adjusted subtitle bitmap image.

11. A method of video processing, comprising:

receiving a video stream and a subtitle stream;

processing the video stream to obtain video data of a video;

processing the subtitle stream to obtain subtitle bitmap data of a subtitle bitmap image;

adjusting, by circuitry of a reception device, the subtitle bitmap data of the subtitle bitmap image to obtain an adjusted subtitle bitmap image based on one or a combination of a color gamut of the video data, a color gamut of the subtitle bitmap data, dynamic range information of the video data, and dynamic range information of the subtitle bitmap data;

when a pixel of a region of the video on which the adjusted subtitle bitmap image is to be superimposed corresponds to a high luminance portion and a mixing ratio of the video data exceeds a threshold value, decreasing, by the circuitry of the reception device, an original luminance level of the pixel to become a decreased luminance level, and superimposing, by the circuitry of the reception device, on the video with the pixel having the decreased luminance level, the adjusted subtitle bitmap image to obtain a superimposed video; and outputting the superimposed video for display.

12. The method of video processing according to claim 11, further comprising, when the pixel of the region of the video does not correspond to the high luminance portion or the mixing ratio of the video data does not exceed the threshold value, superimposing, on the video with the pixel having the original luminance level, the adjusted subtitle bitmap image to obtain the superimposed video.

* * * * *

UNITED STATES PATENT AND TRADEMARK OFFICE
CERTIFICATE OF CORRECTION

Page 1 of 1

PATENT NO. : 10,349,144 B2
APPLICATION NO. : 15/572313
DATED : July 9, 2019
INVENTOR(S) : Ikuo Tsukagoshi It is certified that error appears in the above-identified patent and that said Letters Patent is hereby corrected as shown below:

On the Title Page

Item (30) Foreign Application Priority Data, is missing. Insert after Item (65):
-- (30) Foreign Application Priority Data
Jun. 9, 2015 (JP)……………………..2015-116893 --

Signed and Sealed this
Fifth Day of November, 2019

Andrei Iancu
*Director of the United States Patent and Trademark Office*